United States Patent
Cao et al.

(10) Patent No.: US 12,091,548 B2
(45) Date of Patent: Sep. 17, 2024

(54) CURABLE COMPOSITION FOR SILICONE PRESSURE SENSITIVE ADHESIVES

(71) Applicant: Dow Silicones Corporation, Midland, MI (US)

(72) Inventors: Qing Cao, Shanghai (CN); Shenglan Zhang, Shanghai (CN); Chao Ma, Shanghai (CN)

(73) Assignee: Dow Silicones Corpoation, Midland, MI (US)

( * ) Notice: Subject to any disclaimer, the term of this patent is extended or adjusted under 35 U.S.C. 154(b) by 0 days.

(21) Appl. No.: 18/555,908

(22) PCT Filed: Mar. 30, 2022

(86) PCT No.: PCT/CN2022/084013
§ 371 (c)(1),
(2) Date: Oct. 18, 2023

(87) PCT Pub. No.: WO2023/184222
PCT Pub. Date: Oct. 5, 2023

(65) Prior Publication Data
US 2024/0270965 A1    Aug. 15, 2024

(51) Int. Cl.
C08L 83/08 (2006.01)
C08G 77/00 (2006.01)
(Continued)

(52) U.S. Cl.
CPC .............. *C08L 83/08* (2013.01); *C08G 77/12* (2013.01); *C08G 77/16* (2013.01); *C08G 77/20* (2013.01);
(Continued)

(58) Field of Classification Search
CPC ..... C08L 83/08; C08L 2205/025; C09J 7/381; C09J 183/04; C08G 77/12; C08G 77/16; C08G 77/20; C08G 77/70
See application file for complete search history.

(56) References Cited

U.S. PATENT DOCUMENTS 2,676,182 A    4/1954   Daudt et al.
2,823,218 A    2/1958   Speir et al.
(Continued)

FOREIGN PATENT DOCUMENTS

EP    0556023     8/1993
EP    0347895     11/1993
JP    2004231900   8/2004

*Primary Examiner* — Robert S Jones, Jr.
*Assistant Examiner* — Jiangtian Xu
(74) *Attorney, Agent, or Firm* — Catherine U. Brown (57) ABSTRACT

A curable composition contains: (A) a polydiorganosiloxane component including: (A1) greater than 3.1 wt % to 20 wt % of an aliphatically unsaturated polydiorganosiloxane polymer and (A3) a hydroxyl-terminated polydiorganosiloxane gum of unit formula (A-III); (B) a polyorganosilicate resin component including (B1) a capped resin, (B2) >18.53 wt % to 54.3 wt % of an uncapped resin; where the weight ratio of the uncapped resin (B2) to the capped resin (B1) is greater than 0.51 to 58.82; where component (A) and component (B) are present in amounts to provide a weight ratio of (B):(A) of 1.2:1 to less than 1.62:1; (C) a polyorganohydrogensiloxane that is present in an amount to provide a molar ratio of silicon bonded hydrogen atoms to alkenyl groups for the curable composition of 5 to 50; (D) a hydrosilylation reaction catalyst in an amount sufficient to provide 1 to 1000 ppm of platinum group metal; and (E) a condensation reaction catalyst; where the content of alkenyl groups in the curable composition is 0.017 wt % to 0.089 wt (Continued)

%; and where wt % values are relative to the total weight of components (A), (B), (C), (D) and (E) unless otherwise stated.

10 Claims, 1 Drawing Sheet

(51) Int. Cl.
    *C08G 77/12*     (2006.01)
    *C08G 77/16*     (2006.01)
    *C08G 77/20*     (2006.01)
    *C09J 7/38*     (2018.01)
    *C09J 183/04*     (2006.01)

(52) U.S. Cl.
    CPC .............. *C08G 77/70* (2013.01); *C09J 7/381* (2018.01); *C09J 183/04* (2013.01); *C08L 2205/025* (2013.01)

(56) References Cited

U.S. PATENT DOCUMENTS

| | | |
|---|---|---|
| 3,159,601 A | 12/1964 | Ashby et al. |
| 3,220,972 A | 11/1965 | Lamoreaux |
| 3,296,291 A | 1/1967 | Scotia et al. |
| 3,419,593 A | 12/1968 | Willing et al. |
| 3,516,946 A | 6/1970 | Scotia et al. |
| 3,715,334 A | 2/1973 | Karstedt |
| 3,814,730 A | 6/1974 | Karstedt et al. |
| 3,928,629 A | 12/1975 | Chandra et al. |
| 3,957,713 A | 5/1976 | Jeram et al. |
| 3,989,668 A | 11/1976 | Lee et al. |
| 4,329,273 A | 5/1982 | Hardman et al. |
| 4,611,042 A | 9/1986 | Rivers-Farrell et al. |
| 4,766,176 A | 8/1988 | Lee et al. |
| 4,774,310 A | 9/1988 | Butler |
| 4,784,879 A | 11/1988 | Lee et al. |
| 5,017,654 A | 5/1991 | Togashi et al. |
| 5,036,117 A | 7/1991 | Chung et al. |
| 5,175,325 A | 12/1992 | Brown et al. |
| 6,677,407 B1 | 1/2004 | Bilgrien et al. |
| 8,580,073 B2 | 11/2013 | Behl et al. |
| 9,562,149 B2 | 2/2017 | Cray et al. |
| 9,593,209 B2 | 3/2017 | Dent et al. |
| 2003/0088042 A1 | 5/2003 | Griswold et al. |
| 2004/0254274 A1 | 12/2004 | Griswold |
| 2005/0038188 A1 | 2/2005 | Ahn et al. |
| 2012/0045635 A1 | 2/2012 | Aoki |
| 2012/0328863 A1 | 12/2012 | Kuo |
| 2014/0314985 A1 | 10/2014 | Rathore et al. |
| 2016/0376482 A1 | 12/2016 | Morgeneyer et al. |
| 2017/0233612 A1 | 8/2017 | Han et al. |
| 2021/0277187 A1 | 9/2021 | Abe et al. |
| 2021/0309899 A1* | 10/2021 | Jiang ..................... C08G 77/20 |

\* cited by examiner shows a partial cross section of an adhesive article 100.

| | |
|---|---|
| 100 | adhesive article |
| 101 | first substrate |
| 101b | surface of first substrate 101 |
| 102 | Si-PSA |
| 102a | surface of Si-PSA 102 |
| 102b | opposing surface of Si-PSA 102 |
| 103 | low-adhesion silicone PSA |
| 103a | surface of low-adhesion silicone PSA 103 |
| 103b | opposing surface of low-adhesion silicone PSA 103 |
| 104 | second substrate |
| 104a | surface of second substrate 104 |
| 104b | surface of second substrate 104 |
| 200 | low-adhesion Si-PF |

CURABLE COMPOSITION FOR SILICONE PRESSURE SENSITIVE ADHESIVES

This application is a U.S. national stage filing under 35 U.S.C. § 371 of PCT Application No. PCT/CN2022/084013 filed on 30 Mar. 2022 (30 Mar. 2022), currently pending. PCT Application No. PCT/CN2022/084013 is are hereby incorporated by reference.

FIELD

The present invention relates to a curable composition and a method of preparing the curable composition. Particularly, the present invention relates to a hydrosilation and condensation curable composition that cures to form a silicone pressure sensitive adhesive.

INTRODUCTION

Protective films and carrier tapes are two major applications in the electronics fabrication industry for silicone pressure sensitive adhesives. Typically, during fabrication of electronics, various components of protective films and carrier tapes together with adherends are laminated together to form multiple layers, and it is important for the layers to adhere to one another and not suffer damage causing failure of the component. The multiple layers typically comprise a protective film that adheres to an adherend (e.g., a graphite sheet, a copper foil, or an ultra-thin double-sided tape) used in manufacturing an electronic device in order to protect the adherend from scratches and other damage during processing and/or shipping. It is desired that such protective film cleanly releases from the adherend, e.g., without leaving residue discernable to an end user of the electronic device, which typically requires the protective film with a low adhesion to the adherend, such as adhesion to stainless steel of less than 10 grams per inch according to ASTM D3330. However, such low-adhesion silicone protective film may suffer from the drawback of being difficult to form a quick and strong adhesion to other layers in manufacturing consumer electronics.

Therefore, there is an industry need for a silicone pressure sensitive adhesive that can adhere to a low-adhesion silicone protective film with desirable adhesive properties.

SUMMARY

The present invention provides a novel curable composition that can cure into a cured product that achieves high adhesion (i.e., ≥400 grams per inch (g/in)) to a low-adhesion silicone protective film. "Low-adhesion silicone protective film" refers to a protective film with a low-adhesion silicone pressure sensitive adhesive that is other than the silicone pressure sensitive adhesive of the present invention and that has an adhesion to stainless steel of <10 g/in. Adhesion properties are measured using an Adhesion/Release Tester of AR 1500 in accordance with ASTM D3330. The curable composition of the present invention comprises a novel combination of an aliphatically unsaturated polydiorganosiloxane polymer, a hydroxyl-terminated polydiorganosiloxane gum, a capped polyorganosilicate resin, an uncapped polyorganosilicate resin, a polyorganohydrogensiloxane, a hydrosilylation reaction catalyst and a condensation reaction catalyst at specific concentrations. The curable composition of the present invention is particularly suitable for forming a silicone pressure sensitive adhesive. The curable composition can be cured via both hydrosilylation reaction and condensation reaction (that is, a hydrosilylation reaction and condensation reaction curable composition) to prepare a pressure sensitive adhesive (also as "hydrosilylation/condensation dual-cured PSA").

In a first aspect, the present invention is a curable composition comprising:

(A) a polydiorganosiloxane component comprising:
(A1) greater than 3.1 weight-percent to 20 weight-percent of an aliphatically unsaturated polydiorganosiloxane polymer of formula (A-I):

$$R^M_{(3-c)}R^U_c SiO\text{—}(R^U R^M SiO)_a\text{—}(R^M_2 SiO)_b\text{—}SiR^U_d R^M_{(3-d)} \quad (A\text{-}I)$$

where each $R^M$ is independently selected from the group consisting of a monovalent hydrocarbon group of 1 to 30 carbon atoms that is free of aliphatic unsaturation and a monovalent halogenated hydrocarbon group free of aliphatic unsaturation; each $R^U$ independently an alkenyl group; and subscripts a, b, c and d have average values such that a≥0, b>0, c is zero or 1, d is zero or 1, a quantity (a+b) is 100 to 2000, and a quantity (a+c+d)≥2; and (A3) a hydroxyl-terminated polydiorganosiloxane gum of unit formula (A-III):

$$\{(HO)R^M_2 SiO_{1/2}\}_2 (R^M_2 SiO_{2/2})_e \quad (A\text{-}III)$$

where each $R^M$ is independently selected from the group consisting of a monovalent hydrocarbon group of 1 to 30 carbon atoms that is free of aliphatic unsaturation and a monovalent halogenated hydrocarbon group free of aliphatic unsaturation; and subscript e has a value sufficient to give (A3) the hydroxyl-terminated polydiorganosiloxane gum a plasticity of 20 mil (0.51 mm) to 80 mil (2.03 mm), where plasticity is measured based on ASTM D926 by applying 1 kg load to a spherical sample of 4.2 g in weight for 3 minutes at 25° C. and the results are measured in thousandths of an inch (mil) and the procedure is based on ASTM D926; that is present in an amount to provide a weight ratio of the hydroxyl-terminated polydiorganosiloxane gum (A3) to the aliphatically unsaturated polydiorganosiloxane polymer (A1) of 0.89:1 to 9.33:1;

(B) a polyorganosilicate resin component comprising:
(B1) a capped resin of unit formula (B-I): $(R^M_3 SiO_{1/2})_z (SiO_{4/2})_o Z_f$, where $R^M$ is independently selected from the group consisting of a monovalent hydrocarbon group of 1 to 30 carbon atoms that is free of aliphatic unsaturation and a monovalent halogenated hydrocarbon group free of aliphatic unsaturation, each Z is independently a hydrolyzable group, subscript f is zero to a value sufficient to give the capped resin a hydrolyzable group content up to 2%, and subscripts z and o have values such that o>1, z>4, and a quantity (o+z) has a value sufficient to provide the capped resin with a number average molecular weight of 500 g/mol to <7,000 g/mol;

(B2) greater than 18.53 weight-percent to 54.3 weight-percent of an uncapped resin of unit formula (B-II): $(R^M_3 SiO_{1/2})_{z'}(SiO_{4/2})_{o'} Z_{f'}$, where $R^M$ is independently selected from the group consisting of a monovalent hydrocarbon group of 1 to 30 carbon atoms that is free of aliphatic unsaturation and a monovalent halogenated hydrocarbon group free of aliphatic unsaturation, each Z is independently a hydrolyzable group, subscript f' has a value sufficient to give the uncapped resin a hydrolyzable group content of greater than 3% to 10%, and subscripts z' and o' have values such that o'>1, z'>4, and a quantity (o'+z') has a value sufficient to provide the uncapped resin with a number average molecular weight of 500 g/mol to <7,000 g/mol;

wherein the weight ratio of the uncapped resin (B2) to the capped resin (B1) is greater than 0.51 to 58.82;
where (A) the polydiorganosiloxane component and (B) the polyorganosilicate resin component are present in amounts to provide a weight ratio of (B):(A) of 1.2:1 to less than 1.62:1;
(C) a polyorganohydrogensiloxane of unit formula (C-I):

(C-I), where $R^M$ is as described above in formular (A-I), and subscripts p, q, r, s, t, and u have values such that p≥0, q≥0, r≥0, s≥0, t≥0, u≥0, (t+u)≥2, and a quantity (p+q+r+s+t+u) is sufficient to provide the polyorganohydrogensiloxane with a degree of polymerization of 5 to 100; that is present in an amount to provide a molar ratio of silicon bonded hydrogen atoms to alkenyl groups for the curable composition of 5 to 50;

(D) a hydrosilylation reaction catalyst in an amount sufficient to provide 1 to 1000 ppm of platinum group metal; and (E) a condensation reaction catalyst;
wherein the content of alkenyl groups in the curable composition is in a range of 0.017 weight-percent to 0.089 weight-percent;
where weight-percentages are relative to combined weights of components (A), (B), (C), (D) and (E).

In a second aspect, the present invention is a process for preparing the curable composition of the first aspect. The process comprises:
i) mixing the hydroxyl-terminated polydiorganosiloxane gum (A3), the uncapped resin (B2), and the condensation reaction catalyst (E); and ii) further mixing the resulting mixture obtained from step i) with the aliphatically unsaturated polydiorganosiloxane polymer (A1), the capped resin (B1), the polyorganohydrogensiloxane (C), and the hydrosilylation reaction catalyst (D); thereby forming the curable composition.

In a third aspect, the present invention is an adhesive article comprising a substrate and a silicone pressure sensitive adhesive on at least one surface of the substrate, wherein the silicone pressure sensitive adhesive is a cured product of the curable composition of the first aspect.

In a fourth aspect, the present invention is a method of making an adhesive article. The method comprises: optionally (1) treating a surface of a substrate, (2) coating the curable composition of the first aspect on at least one surface of the substrate, and (3) curing the curable composition.

DETAILED DESCRIPTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International methods.

Products identified by their tradename refer to the compositions available under those tradenames on the priority date of this document.

"And/or" means "and, or as an alternative". All ranges include endpoints unless otherwise indicated.

"Viscosity" for a polydiorganosiloxane (such as component (A1) below) is measured according to ASTM 1084 using rotational viscometry with a Brookfield viscometer DV-II at 25 degrees Celsius (C) unless otherwise stated.

"Plasticity" for a polydiorganosiloxane gum is measured based on ASTM D926 by applying 1 kilogram (kg) load to a spherical sample of 4.2 gram (g) in weight for 3 minutes (min) at 25° C. and the results are measured in thousandths of an inch (mil) and the procedure is based on ASTM D926 unless otherwise stated.

Chemical structure for a polydiorganosiloxane, polyorganosilicate resin, or polyorganohydrogensiloxane is determined by standard $^1$H, $^{13}$C and $^{29}$Si nuclear magnetic resonance (NMR) analysis.

"Adhesion" properties are determined using an Adhesion/Release Tester of AR 1500 in accordance with ASTM D3330 unless otherwise stated.

Unless otherwise stated, the number average molecular weight (Mn) refers to the number average molecular weight measured using gel permeation chromatography (GPC) and the weight average molecular weight (Mw) refers to the weight average molecular weight measured using GPC. For example, a suitable GPC test method for measuring Mn and Mw is disclosed in U.S. Pat. No. 9,593,209, Reference Example 1 at col. 31.

The curable composition of the present invention comprises components (A), (B), (C), (D) and (E), and optional components described below. The curable composition comprises (A) a polydiorganosiloxane component (component (A)). The polydiorganosiloxane component (A) may comprise or consist of (A1) an aliphatically unsaturated polydiorganosiloxane polymer (also as "Vi Polymer") and (A3) a hydroxyl-terminated polydiorganosiloxane gum (also as "OH Gum"), and optionally (A2) an aliphatically unsaturated polydiorganosiloxane gum (also as "Vi Gum").

The aliphatically unsaturated polydiorganosiloxane polymer (A1) (component (A1)) has formula (A-I):

(A-I)

where each $R^M$ is independently selected from the group consisting of a monovalent hydrocarbon group of 1 to 30 carbon atoms that is free of aliphatic unsaturation and a monovalent halogenated hydrocarbon group of 1 to 30 carbon atoms free of aliphatic unsaturation, each $R^U$ is independently an alkenyl group, subscripts a, b, c and d have average values such that a≥0, b>0, c is zero or 1, d is zero or 1, a quantity (a+b) is 100 to 2000, and a quantity (a+c+d)≥2. Suitable monovalent hydrocarbon groups and monovalent halogenated hydrocarbon groups for $R^M$ are as defined below. Each $R^M$ may have 1 to 30 carbon atoms, and can be 1 to 12 carbon atoms, 1 to 10 carbon atoms, 1 to 6 carbon atoms, 1 to 4 carbon atoms, 1 to 2 carbon atoms, or even 1 carbon atom. Each $R^M$ may be independently an alkyl group, an aryl group or an aralkyl group as defined below. Desirably, each $R^M$ is an alkyl group of 1 to 6 carbon atoms or an aryl group such as phenyl. More desirably, each $R^M$ is methyl. Each $R^U$ may be independently an alkenyl group as defined below. Each $R^U$ may have 2 to 12 carbon atoms, 2 to 10 carbon atoms, 2 to 6 carbon atoms, 2 to 4 carbon atoms, or even 2 carbon atoms. Desirably, each $R^U$ is independently selected from the group consisting of vinyl, allyl, and hexenyl. Alternatively, a quantity (a+b) may have a value sufficient to impart a viscosity of 300 milliPascal*seconds (mPa·s) to 100,000 mPa·s to the aliphatically unsaturated polydiorganosiloxane polymer, and can be from 350 mPa·s to 90,000 mPa·s, from 400 mPa·s to 80,000 mPa·s, or from 450 mPa·s to 70,000 mPa·s. Desirably, the aliphatically unsaturated polydiorganosiloxane polymer (A1) has a viscosity of 450 to 40,000 mPa·s. Alternatively, a quantity (a+b) may have a value sufficient to give the aliphatically unsaturated polydiorganosiloxane polymer a Mn of 5,000 grams per mole (g/mol) to 100,000 g/mol, 10,000 g/mol to 100,000 g/mol, 11,000 g/mol to 90,000 g/mol, or 11,500 g/mol to 90,000 g/mol, and desirably, the aliphatically unsaturated polydiorganosiloxane polymer has a Mn of 10,000 g/mol to 40,000 g/mol as measured by GPC. Desirably, in formula (A-I), each $R^M$ is independently an alkyl group of 1 to 6 carbon atoms such as methyl; each $R^U$ is independently selected from the group consisting of vinyl, allyl and hexenyl; and a quantity (a+b) has a value sufficient to impart a viscosity of 300 mPa·s to 100,000 mPa·s to the aliphatically unsaturated polydiorganosiloxane polymer.

"Alkyl" means a cyclic, branched, or unbranched, saturated monovalent hydrocarbon group. Alkyl is exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, and branched alkyl groups of 6 or more carbon atoms; and cyclic alkyl groups such as cyclopentyl and cyclohexyl. Alkyl groups have 1 to 12 carbon atoms, and can be 1 to 10 carbon atoms, 1 to 6 carbon atoms, 1 to 4 carbon atoms, 1 to 2 carbon atoms, or even 1 carbon atom. "Aryl" means a cyclic, fully unsaturated, hydrocarbon group. Aryl is exemplified by, but not limited to, cyclopentadienyl, phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms. "Aralkyl" means an alkyl group having a pendant and/or terminal aryl group or an aryl group having a pendant alkyl group. Exemplary aralkyl groups include tolyl, xylyl, benzyl, phenylethyl, phenyl propyl, and phenyl butyl.

"Alkenyl" means a branched or unbranched, monovalent hydrocarbon group having one or more carbon-carbon double bonds. Suitable alkenyl groups are exemplified by vinyl, allyl, butenyl, pentenyl, hexenyl, and heptenyl, (including branched and linear isomers of 3 to 7 carbon atoms); and cyclohexenyl. Desirably, the alkenyl group is selected from the group consisting of vinyl, allyl, or hexenyl.

"Monovalent hydrocarbon group" means a univalent group made up of hydrogen and carbon atoms. Monovalent hydrocarbon groups include alkyl, aralkyl, alkenyl, and cycloalkyl groups as defined above.

"Monovalent halogenated hydrocarbon group" means a monovalent hydrocarbon group where one or more hydrogen atoms bonded to a carbon atom have been formally replaced with a halogen atom. Halogenated hydrocarbon groups include haloalkyl groups, halogenated carbocyclic groups, and haloalkenyl groups. Haloalkyl groups include fluorinated alkyl groups and fluorinated cycloalkyl groups such as trifluoromethyl (CF3), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl; and chlorinated alkyl and chlorinated cycloalkyl groups such as chloromethyl, 3-chloropropyl 2,2-dichlorocyclopropyl, 2,3-dichlorocyclopentyl. Haloalkenyl groups include chloroallyl.

The aliphatically unsaturated polydiorganosiloxane polymer (A1) may comprise one polydiorganosiloxane of formula (A-I) or a combination of two or more polydiorganosiloxanes of formula (A-I) that may differ in one or more properties such as viscosity, molecular weight, structure, siloxane units and sequence. Suitable aliphatically unsaturated polydiorganosiloxane polymers for use as component (A1) in the curable composition may comprise any one or any combination of more than one of the following polydiorganosiloxanes: i) dimethylvinylsiloxy-terminated polydimethylsiloxane, ii) dimethylvinylsiloxy-terminated poly(dimethylsiloxane/methylphenylsiloxane), iii) dimethylvinylsiloxy-terminated poly(dimethylsiloxane/diphenylsiloxane), iv) phenyl, methyl, vinyl-siloxy-terminated polydimethylsiloxane, v) dimethylhexenylsiloxy-terminated polydimethylsiloxane, iv) dimethylvinylsiloxy-terminated poly(dimethylsiloxane/methylhydrogensiloxane), and vii) trimethylsiloxy-terminated poly(dimethyl siloxane/vinylmethylhydrogensiloxane). Desirably, the aliphatically unsaturated polydiorganosiloxane polymer is selected from the group consisting of bis-vinyldimethylsiloxy-terminated polydimethylsiloxane bis-vinyldimethylsiloxy-terminated polydimethylsiloxane, bis-vinyldimethylsiloxy-terminated polydimethylsiloxane, dimethylvinylsiloxy-terminated poly (dimethylsiloxane/methylhydrogensiloxane), trimethylsiloxy-terminated poly(dimethylsiloxane/vinylmethylhydrogensiloxane), or mixtures thereof. Methods of preparing the aliphatically unsaturated polydiorganosiloxanes such as hydrolysis and condensation of the corresponding organohalosilanes or equilibration of cyclic polydiorganosiloxanes, are well known in the art.

The aliphatically unsaturated polydiorganosiloxane polymer (A1) may be present at a concentration of greater than 3.1 (>3.1) weight-percent (wt %), and can be 3.3 wt % or more, 3.5 wt % or more, 3.7 wt % or more, 3.9 wt % or more, 4.0 wt % or more, 4.1 wt % or more, 4.2 wt % or more, 4.3 wt % or more, 4.4 wt % or more, 4.5 wt % or more, 4.6 wt % or more, 4.7 wt % or more, 4.8 wt % or more, 4.9 wt % or more, or even 5% or more, while at the same time is generally 20 wt % or less, and can be 19.8 wt % or less, 19.5 wt % or less, 19.1 wt % or less, 18 wt % or less, 17 wt % or less, 16.4 wt % or less, 16 wt % or less, 15 wt % or less, 14 wt % or less, 11 wt % or less, 10 wt % or less, 9.1 wt % or less, 8 wt % or less, 5 wt % or less, or even 4.9 wt % or less, and desirably, the aliphatically unsaturated polydiorganosiloxane polymer is present at a concentration of 5 wt % to 16 wt %; based on combined weights of components (A), (B), (C), (D) and (E).

The polydiorganosiloxane component (A) may comprise or be free of (A2) an aliphatically unsaturated polydiorganosiloxane gum (component (A2)) of formula (A-II):

(A-II)

where each $R^M$ is as described above in formula (A-I), each $R^U$ is as described above in formula (A-I), subscripts a', b', c' and d' have average values such that a'≥0, subscript b'>0, subscript c' is zero or 1, subscript d' is zero or 1, (a'+c'+d)≥2; and a quantity (a'+b') has a value sufficient to give (A-2) the aliphatically unsaturated polydiorganosiloxane gum a plasticity of 20 mil (0.51 millimeter (mm)) to 80 mil (2.03 mm), 30 mil (0.76 mm) to 70 mil (1.78 mm), 50 mil (1.27 mm) to 65 mil (1.65 mm), where plasticity is measured according to ASTM D926 (further details provided above). Typically, a quantity (a'+b') may have a value >2000, and can be 3000 or more, 4000 or more, or even 5000 or more.

The aliphatically unsaturated polydiorganosiloxane gums are known in the art and may be prepared by methods such as hydrolysis and condensation of the corresponding organohalosilanes or equilibration of cyclic polydiorganosiloxanes. The aliphatically unsaturated polydiorganosiloxane gum (A2) may comprise a combination of two or more polydiorganosiloxane gum of unit formula (A-II) that may differ in one or more properties such as plasticity, structure, siloxane units and sequence. Suitable aliphatically unsaturated polydiorganosiloxane gum for use as component (A2) in the curable composition may comprise any one or any combination of more than one of the following polydiorganosiloxane gums:
  i) dimethylvinylsiloxy-terminated polydimethylsiloxane,
  ii) dimethylvinylsiloxy-terminated poly(dimethylsiloxane/methylphenyl)siloxane,
  iii) dimethylvinylsiloxy-terminated poly(dimethylsiloxane/diphenyl)siloxane,
  iv) phenyl,methyl,vinyl-siloxy-terminated polydimethylsiloxane,
  v) dimethylhexenylsiloxy-terminated polydimethylsiloxane,
  vi) dimethylhexenylsiloxy-terminated poly(dimethylsiloxane/methylphenyl)siloxane, and
  vii) dimethylvinylsiloxy-terminated poly(dimethylsiloxane/diphenyl)siloxane.

Desirably, the polydiorganosiloxane gum is selected from the group consisting of i) dimethylvinylsiloxy-terminated polydimethylsiloxane, v) dimethylhexenylsiloxy-terminated polydimethylsiloxane, or mixture thereof.

The aliphatically unsaturated polydiorganosiloxane gum (A2) may be present at a concentration of zero or more, and can be greater than zero (>0), while at the same time is generally 7 wt % or less, and can be 6 wt % or less, 5 wt % or less, 3 wt % or less, 1.1 wt % or less, 1 wt % or less, or even 0.1 wt % or less, based on combined weights of components (A), (B), (C), (D) and (E). Alternatively, the aliphatically unsaturated polydiorganosiloxane gum (A2) may be present in an amount to provide the total concentration of the aliphatically unsaturated polydiorganosiloxane polymer (A1) and the aliphatically unsaturated polydiorganosiloxane gum (A2) of >3.1 wt %, and can be 3.3 wt % or more, 3.5 wt % or more, 3.7 wt % or more, 3.9 wt % or more, 4.0 wt % or more, 4.1 wt % or more, 4.2 wt % or more, 4.3 wt % or more, 4.4 wt % or more, 4.5 wt % or more, 4.6 wt % or more, 4.7 wt % or more, 4.8 wt % or more, or even 4.9 wt % or more, while at the same time is generally 20 wt % or less, and can be 19.8 wt % or less, 19.5 wt % or less, 19.1 wt % or less, 18 wt % or less, 17 wt % or less, 16.4 wt % or less, 15 wt % or less, 14 wt % or less, 11 wt % or less, 10 wt % or less, 9.1 wt % or less, 8 wt % or less, 5 wt % or less, or even 4.9 wt % or less, based on combined weights of components (A), (B), (C), (D) and (E).

The polydiorganosiloxane component (A) also comprises (A3) a hydroxyl-terminated polydiorganosiloxane gum ("OH Gum", component (A3)) of unit formula (A-III):

(A-III)

where each $R^M$ is as described above in formula (A-I); and subscript e has a value sufficient to give (A3) the hydroxyl-terminated polydiorganosiloxane gum a plasticity of 20 mil (0.51 mm) to 80 mil (2.03 mm), and can be 30 mil (0.76 mm) or more, 50 mil (1.27 mm) or more, or even 53 mil (1.27 mm) or more, while at the same time can be 70 mil (1.78 mm) or less, 65 mil (1.65 mm) or less, or even 60 mil (1.65 mm) or less; where plasticity is measured according to ASTM D926 (further details provided above). Alternatively, subscript e may have a value sufficient to give the hydroxyl-terminated polydiorganosiloxane gum a Mn of ≥200,000 g/mol as measured by GPC. Desirably, in unit formula (A-III), each $R^M$ is independently an alkyl group of 1 to 6 carbon atoms such as methyl; and each $R^U$ is independently selected from the group consisting of vinyl, allyl, and hexenyl, and subscript e is sufficient to provide the hydroxyl-terminated polydiorganosiloxane gum with a plasticity of 30 mil (0.76 mm) to 70 mil (1.78 mm).

Hydroxyl-terminated polydiorganosiloxane gums suitable for the present invention are known in the art and may be prepared by methods such as hydrolysis and condensation of the corresponding organohalosilanes or equilibration of cyclic polydiorganosiloxanes. The hydroxyl-terminated polydiorganosiloxane gum (A3) may comprise one or a combination of two or more polydiorganosiloxane gum of unit formula (A-III) that may differ in properties such as plasticity, structure, and sequence. Suitable hydroxyl-terminated polydiorganosiloxane gums for use as component (A3) may comprise any one or any combination of more than one of the following polydiorganosiloxanes: i) bis-hydroxyl-terminated polydimethylsiloxane, ii) bis-hydroxyl-terminated poly(dimethylsiloxane/methylphenylsiloxane), iii) bis-hydroxyl-terminated poly(dimethylsiloxane/diphenylsiloxane), and iv) phenyl, methyl,hydroxyl-siloxy-terminated polydimethylsiloxane. Desirably, the hydroxyl-terminated polydiorganosiloxane gum (A3) comprises bis-hydroxyl-terminated polydimethylsiloxane.

The hydroxyl-terminated polydiorganosiloxane gum (A3) is present in the curable composition at a concentration of 17.67 wt % or more, and can be 18 wt % or more, 19 wt % or more, 20 wt % or more, 21 wt % or more, 22 wt % or more, 22.5 wt % or more, 23 wt % or more, 23.5 wt % or more, 24 wt % or more, or even 24.5% or more, while at the same time is generally 36.2 wt % or less, and can be 36 wt % or less, 35.5 wt % or less, 35.1 wt % or less, 35 wt % or less, 34.6% or less, 34.5 wt % or less, 34 wt % or less, 33.5 wt % or less, 33 wt % or less, 32.5 wt % or less, 32 wt % or less, 31.5 wt % or less, 31 wt % or less, 30 wt % or less, or even 29.5 wt % or less, and desirably, 17.67 wt % to 36.2 wt %, and more desirably, 20 wt % to 30 wt %; based on combined weights of components (A), (B), (C), (D) and (E).

The aliphatically unsaturated polydiorganosiloxane polymer (A1) and the hydroxyl-terminated polydiorganosiloxane gum (A3) may be present in amounts such that a weight ratio of the hydroxyl-terminated polydiorganosiloxane gum (A3) to the aliphatically unsaturated polydiorganosiloxane polymer (A1) ("A3:A1 ratio") may be 0.89:1 or higher, and can be 1:1 or higher, 1.1:1 or higher, 1.2:1 or higher, 1.3:1 or higher, 1.5:1 or higher, 1.8:1 or higher, 2.0:1 or higher, 2.5:1 or higher, 3.0:1 or higher, 3.5:1 or higher, or even 7.2:1 or higher, while at the same time is generally 9.33:1 or lower, and can be 9.0:1 or lower, 8.5:1 or lower, 8.0:1 or lower, 7.5:1 or lower, 7.3:1 or lower, 6:1 or lower, 5:1 or lower, 4.0:1 or lower, or even 3.6:1 or lower, and desirably, the A3:A1 ratio is in a range of 1:1 to 5:1.

The curable composition further comprises (B) a polyorganosilicate resin component (component (B)), which comprises or consists of (B1) a capped resin and (B2) an uncapped resin. Polyorganosilicate resins, which comprises monofunctional units ("M" units) of formula $R^M_3SiO_{1/2}$ and tetrafunctional silicate units ("Q" units) of formula $SiO_{4/2}$, where each $R^M$ is as described above in formula (A-I). For example, at least one-third, or at least two thirds of the $R^M$ groups are alkyl groups such as methyl groups. The M units may be exemplified by $(Me_3SiO_{1/2})$ and $(Me_2PhSiO_{1/2})$, where Me represents methyl and Ph represents phenyl. The polyorganosilicate resin is soluble in solvents such as those described below, exemplified by liquid hydrocarbons, such as benzene, toluene, xylene, and heptane, or in liquid organosilicon compounds such as low viscosity linear and cyclic polydiorganosiloxanes.

When prepared, the polyorganosilicate resin comprises the M and Q units described above, and the polyorganosiloxane further comprises units with silicon bonded hydroxyl groups and may comprise neopentamer of formula $Si(O-SiR^M_3)_4$, where $R^M$ is as described above, e.g., the neopentamer may be tetrakis(trimethylsiloxy)silane. $^{29}Si$ NMR spectroscopy may be used to measure hydroxyl (OH) content and molar ratio of M and Q units, where said ratio is expressed as {M(resin)}/{Q(resin)}, excluding M and Q units from the neopentamer. "M:Q ratio" represents the molar ratio of the total number of triorganosiloxy groups (M units) of the resinous portion of the polyorganosilicate resin to the total number of silicate groups (Q units) in the resinous portion. M:Q ratio may be 0.5:1 to 1.5:1.

The Mn of the polyorganosilicate resin depends on various factors including the types of hydrocarbon groups represented by $R^M$ that are present. The Mn of the polyorganosilicate resin refers to the number average molecular weight measured using GPC, when the peak representing the neopentamer is excluded from the measurement. The Mn of the polyorganosilicate resin is 500 grams per mole (g/mol) to 5,000 g/mol, and can be 2,500 g/mol to 5,000 g/mol, 2,700 g/mol to 4,900 g/mol, or 2,700 g/mol to 4,700 g/mol. A suitable GPC test method for measuring Mn is disclosed in U.S. Pat. No. 9,593,209, Reference Example 1 at col. 31.

U.S. Pat. No. 8,580,073 at col. 3, line 5 to col. 4, line 31, and U.S. Patent Publication 2016/0376482 at paragraphs [0023] to [0026] are hereby incorporated by reference for disclosing MQ resins, which are suitable polyorganosilicate resins for use in the hydrosilylation reaction curable composition described herein. The polyorganosilicate resin can be prepared by any suitable method, such as cohydrolysis of the corresponding silanes or by silica hydrosol capping methods. The polyorganosilicate resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having M-units and Q-units. The resulting copolymers generally contain from 2 to 5 percent by weight of hydroxyl groups.

The intermediates used to prepare the polyorganosilicate resin may be triorganosilanes and silanes with four hydrolyzable substituents or alkali metal silicates. The triorganosilanes may have formula $R^M_3SiX^1$, where $R^M$ is as described above and $X^1$ represents a hydrolyzable substituent such as halogen, alkoxy, acyloxy, hydroxyl, oximo, or ketoximo; alternatively, halogen, alkoxy or hydroxyl. Silanes with four hydrolyzable substituents may have formula $SiX^2_4$, where each $X^2$ is halogen, alkoxy or hydroxyl. Suitable alkali metal silicates include sodium silicate.

The polyorganosilicate resin prepared as described above is an uncapped resin (B2), which typically contains silicon bonded hydroxyl groups, e.g., of formulae, $HOSi_{3/2}$ and/or $HOR^M_2SiO_{1/2}$. The uncapped resin may comprise >3% to 10% of silicon bonded hydroxyl groups (also as "silanol groups"), as measured by NMR spectroscopy. For certain applications, it may be desirable for the amount of silicon bonded hydroxyl groups to be ≤2%, this is, forming a capped resin (B1), alternatively <0.7%, alternatively below 0.3%, alternatively less than 1%, and alternatively 0.3% to 2%. Silicon bonded hydroxyl groups formed during preparation of the polyorganosilicate resin can be converted to trihydrocarbon siloxane groups or to a different hydrolyzable group by reacting the silicone resin with a silane, disiloxane, or disilazane containing the appropriate terminal group in a process referred to a capping. Silanes containing hydrolyzable groups may be added in molar excess of the quantity required to react with the silicon bonded hydroxyl groups on the polyorganosilicate resin.

When the polyorganosilicate resin is a capped resin, the capped resin may comprise 2% or less, and can be 0.7% or less, or 0.3% or less, and can be 0.3% to 0.8% of units represented by formula $HOSiO_{3/2}$ and/or $HOR^M_2SiO_{1/2}$ where $R^M$ is as described above. The concentration of silanol groups present in the polyorganosiloxane may be determined using NMR spectroscopy as described above.

The capped resin (B1) (also as "capped MQ resin", component (B1)) may have unit formula (B-I): $(R^M_3SiO_{1/2})_z(SiO_{4/2})_oZ_f$, where each $R^M$ is as described above in formula (A-I); each Z is independently a hydrolyzable group, which can be selected from the group consisting of alkoxy, hydroxyl, or combinations thereof; and subscripts z and o have values such that o>1, z>4, and a quantity (o+z) has a value sufficient to provide the capped resin with the Mn of 500 g/mol to <7,000 g/mol, and can be 500 g/mol or more, 1,000 g/mol or more, or even 2,900 g/mol or more, while at the same time is less than 7,000 g/mol, can be 5,000 g/mol or less, 4,700 g/mol or less, or even 4,100 g/mol or less; and subscript f has a value sufficient to give the capped resin a hydrolyzable group content of zero to 2%, and can be zero or more, 0.3% or more, 0.7% or more, or even 0.8% or more, while at the same time is 2% or less, 1.9% or less, 1.8% or less, 1.7% or less, 1.6% or less, 1.5% or less, 1.4% or less, 1.3% or less, 1.2% or less, 1.1% or less, or even 1% or less. Percentages of the hydrolyzable group in a resin in the present invention refer to weight percentages of the hydrolyzable group relative to the resin weight, as determined by Fourier Transfer Infra-Red (FTIR) spectroscopy. Typically, each Z is hydroxyl (OH).

The capped resin (B1) may be present at a concentration of 0.9 wt % or more, and can be 1 wt % or more, 5 wt % or more, 10 wt % or more, 15 wt % or more, 20 wt % or more, 25 wt % or more, 27 wt % or more, 29 wt % or more, or even 30 wt % or more, while at the same time is generally 35.9 wt % or less, and can be 35% or less, 34 wt % or less, 33 wt % or less, 32 wt % or less, 31 wt % or less, or even 30.5 wt % or less, based on combined weights of components (A), (B), (C), (D) and (E).

The uncapped resin (B2) ("uncapped MQ resin", component (B2)) may have unit formula (B-II): $(R^M_3SiO_{1/2})_{z'}(SiO_{4/2})_oZ_f$ (B-II), where each $R^M$ is as described in formula (A-I), each Z is as described above, e.g., hydroxyl, and subscripts z' and o' have values such that o'>1, z'>4, and a quantity (o'+z') has a value sufficient to give the uncapped resin the Mn of 500 g/mol to <7,000 g/mol, and can be 500 g/mol or more, 1,000 g/mol or more, 2,700 g/mol or more, or even 2,900 g/mol or more, while at the same time is generally less than 7,000 g/mol, and can be 5,000 g/mol or less, 4,700 g/mol or less, or even 4,300 g/mol or less; and subscript f has a value sufficient to give the uncapped resin a hydrolyzable group content of greater than 3% (i.e., >3%), and can be 3.1% or more, 3.2% or more, or even 3.4% or more, while at the same time is generally 10% or less, and can be 5% or less, or even 4% or less. Desirably, in unit formula (B-II), each $R^M$ is an independently selected alkyl group of 1 to 6 carbon atoms such as methyl, each Z is OH, and the quantity (z+0) has a value sufficient to provide the uncapped resin with a Mn of 2,900 g/mol to 5,000 g/mol.

The uncapped resin (B2) may be present in an amount of greater than 18.53 wt % (>18.53 wt %), and can be 18.8 wt % or more, 19.0 wt % or more, 19.2 wt % or more, 19.5 wt % or more, 19.9 wt % or more, 22 wt % or more, 24 wt % or more, 24.5 wt % or more, 25 wt % or more, 28 wt % or more, 30 wt % or more, or even 32% or more, while at the same time is generally 54.3 wt % or less, and can be 54 wt % or less, 53 wt % or less, 52 wt % or less, 51 wt % or less, 50 wt % or less, 49 wt % or less, 48 wt % or less, 47 wt % or less, 46.5 wt % or less, or even 46.3 wt % or less, based on combined weights of components (A), (B), (C), (D) and (E).

The amounts of capped resin and uncapped resin in the polyorganosilicate resin component may be sufficient to provide a weight ratio of the uncapped resin (B2) to the capped resin (B1), i.e., (B2):(B1) ratio, of greater than 0.51 (>0.51), and can be 0.55 or higher, 0.6 or higher, 0.7 or higher, 0.8 or higher, 1.0 or higher, 1.2 or higher, 1.3 or higher, 1.4 or higher, 1.8 or higher, 2.0 or higher, or even 2.2 or higher, while at the same time is generally 58.82 or lower, and can be 40 or lower, 30 or lower, 20 or lower, 10 or lower, 5 or lower, 4.9 or lower, or even 4.85 or lower, and desirably the (B2):(B1) ratio is 0.55 to 5, and more desirably 0.8 to 5.0.

The polydiorganosiloxane component (A) and the polyorganosilicate resin component (B) may be present in the curable composition in amounts sufficient to provide a weight ratio of the polyorganosilicate resin component (B) to the polydiorganosiloxane component (A), i.e., (B):(A) ratio or R/P ratio, of 1.2:1 or higher, and can be 1.25:1 or higher, 1.28:1 or higher, 1.29:1 or higher, 1.30:1 or higher, 1.31:1 or higher, or even 1.4:1 or higher, while at the same time is generally less than 1.62:1 (<1.62:1), and can be 1.60:1 or lower, 1.58:1 lower, 1.56:1 lower, 1.54:1 lower, 1.53:1 or lower, 1.52:1 or lower, 1.50:1 or lower, 1.49:1 or lower, 1.45:1 or lower, 1.44:1 or lower, 1.42:1 or lower, or even 1.4:1 or lower, and desirably, the R/P ratio is 1.2:1 to 1.5:1. For example, the R/P ratio described above can be the ratio of combined weights of components (B1) and (B2): combined weights of components (A1) and (A3), and (A2) if present.

The curable composition of the present invention also comprises (C) a polyorganohydrogensiloxane ("SiH crosslinker", component (C)). The polyorganohydrogensiloxane acts as a crosslinker in the curable composition. The polyorganohydrogensiloxane may have 2 or more or at least 3, silicon bonded hydrogen atoms per molecule.

The polyorganohydrogensiloxane may comprise unit formula (C-I):

(C-I), where $R^M$ is as described above in formula (A-I), and subscripts p, q, r, s, t, and u have values such that p≥0, q≥0, r≥0, s≥0, t≥0, u≥0, (t+u)≥2, and a quantity (p+q+r+s+t+u) is sufficient to provide the polyorganohydrogensiloxane with a degree of polymerization of 5 to 100, or 10 to 60. Degree of polymerization can be determined according to chemical structure and/or Mn of the polyorganohydrogensiloxane. Alternatively, the polyorganohydrogensiloxane may comprise unit formula (C-2):

(C-2), where each $R^M$ is independently selected from the group consisting of methyl and phenyl, subscript aa is 0 to 30, and subscript bb is 5 to 50.

Alternatively, the polyorganohydrogensiloxane is a polyorganohydrogensiloxane formula (C-3), of formula (C-4), or both (C-3) and (C-4):

(C-3), (C-4),

In formulae (C-3) and (C-4) above, $R^M$ is as described above. Subscript g has an average value of 0 to 2000, subscript h has an average value of 2 to 2000, subscript i has an average value of 0 to 2000, and subscript j has an average value of 0 to 2000.

The polyorganohydrogensiloxane (C) may comprise a silicon bonded hydrogen content of 0.5% to 2% or 0.6% to 1.5%, where the silicon bonded hydrogen (SiH) content ("SiH content") refers to the weight percentages of the silicon bonded hydrogen relative to the polyorganohydrogensiloxane weight and can be determined using Fourier Transfer Infra-Red (FTIR) spectroscopy.

Suitable polyorganohydrogensiloxanes for use as component (C) may comprise any one or any combination of more than one of the following polyorganohydrogensiloxanes: i) bis-dimethylhydrogensiloxy-terminated poly(dimethyl/methylhydrogen)siloxane, ii) bis-dimethylhydrogensiloxy-terminated polymethylhydrogensiloxane, iii) bis-trimethylsiloxy-terminated poly(dimethyl/methylhydrogen)siloxane, and iv) bis-trimethylsiloxy-terminated polymethylhydrogensiloxane.

Methods of preparing polyorganohydrogensiloxanes, such as hydrolysis and condensation of organohydridohalosilanes, are well known in the art, for example, see U.S. Pat. No. 3,957,713 to Jeram et al. and U.S. Pat. No. 4,329,273 to Hardman, et al. Polyorganohydrogensiloxanes can also be prepared as described, for example in U.S. Pat. No. 2,823,218 to Speier, et al., which discloses organohydrogensiloxane oligomers and linear polymers, e.g., 1,1,1,3,3-pentamethyldisiloxane; bis-trimethylsiloxy-terminated polymethylhydrogensiloxane homopolymer; bis-trimethylsiloxy-terminated poly(dimethyl/methylhydrogen)siloxane copolymer; and cyclic polymethylhydrogensiloxanes. Polyorganohydrogensiloxanes are also commercially available, such as those available from Gelest, Inc. of Morrisville, Pennsylvania, USA, for example, HMS-H271, HMS-071, HMS-993, HMS-301, HMS-301 R, HMS-031, HMS-991, HMS-992, HMS-993, HMS-082, HMS-151, HMS-013, HMS-053, HAM-301, HPM-502, and HMS-HM271.

Typically, the amount of polyorganohydrogensiloxane in the curable composition may be 0.1 wt % or more, and can be 0.25 wt % or more, and can be 0.3 wt % or more, or even 0.4 wt % or more while at the same time is generally 10.0 wt % or less, and can be 5 wt % or less, 4.8 wt % or less, 4.5 wt % or less, 4.2 wt % or less, 4.1 wt % or less, 4.04 wt % or less, or even 1 wt % or less, based on combined weights of components (A), (B), (C), (D) and (E).

The silicon bonded hydrogen to alkenyl group ratio in the curable composition is important when relying on a hydrosilylation cure process. Generally, this is determined by calculating the total weight % of alkenyl groups in the composition, e.g., vinyl [V] and the total weight % of silicon bonded hydrogen [H] in the composition and given the molecular weight of hydrogen is 1 and of vinyl is 27 the molar ratio of silicon bonded hydrogen to vinyl is 27[H]/[V]. The aliphatically unsaturated polydiorganosiloxane component and the polyorganohydrogensiloxane (C) may be present in the curable composition in an amount sufficient to provide a mole ratio of silicon bonded hydrogen atoms to alkenyl groups in the curable composition of 5 or higher, 5.1 or higher, 5.5 or higher, 5.8 or higher, 6.1 or higher, 6.5 or higher, 6.8 or higher, 9 or higher, 10 or higher, 11 or higher, 12 or higher, 13 or higher, or even 14 or higher, while at the same time is generally 50 or lower, and can be 35.2 or lower, 35 or lower, 34 or lower, 30 or lower, 25 or lower, 22.5 or lower, 22 or lower, 15 or lower, or even 14.9 or lower, and desirably, 10 to 30.

Components in the curable composition of the present invention are present in amounts t to provide a content of alkenyl groups (e.g., vinyl groups) for the curable composition of 0.017 wt % or more, and can be 0.020 wt % or more, 0.022 wt % or more, while at the same time is generally 0.089 wt % or less, and can be 0.085 wt % or less, 0.08 wt % or less, 0.075 wt % or less, 0.07 wt % or less, 0.06 wt % or less, 0.05 wt % or less, 0.045 wt % or less, 0.041 wt % or less, 0.03 wt % or less, or even 0.022 wt % or less, and desirably, 0.03 wt % to 0.08 wt %, based on combined weights of components (A), (B), (C), (D) and (E). The content of alkenyl groups (such as vinyl content) can be determined by $^{29}$Si NMR.

The curable composition of the present invention also comprises (D) a hydrosilylation reaction catalyst (component (D)). Hydrosilylation reaction catalysts are known in the art and are commercially available. Hydrosilylation reaction catalysts include platinum group metal catalysts. Such hydrosilylation reaction catalysts can be (D-1) a metal selected from platinum, rhodium, ruthenium, palladium, osmium, and iridium; alternatively, platinum, ruthenium and iridium; and desirably the metal is platinum. Alternatively, the hydrosilylation reaction catalyst may be (D-2) a compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, or platinum dichloride. Alternatively, the hydrosilylation reaction catalyst may be (D-3) a complex of the platinum group metal compound with an alkenyl functional organopolysiloxane oligomer, or (D-4) the platinum group metal compound microencapsulated in a matrix or core-shell type structure. Complexes of platinum alkenyl functional organopolysiloxane oligomers include 1,3-diethenyl-1,1,3,3-tetramethyldisiloxane complexes with platinum (Karstedt's Catalyst). Alternatively, the hydrosilylation catalyst may comprise (D-5) the complex microencapsulated in a resin matrix. Exemplary hydrosilylation reaction catalysts are described in U.S. Pat. No. 2,823,218 to Speier; U.S. Pat. No. 3,159,601 to Ashby; U.S. Pat. No. 3,220,972 to Lamoreaux; U.S. Pat. No. 3,296,291 to Chalk, et al.; U.S. Pat. No. 3,419,593 to Willing; U.S. Pat. No. 3,516,946 to Modic; U.S. Pat. No. 3,715,334 to Karstedt; U.S. Pat. No. 3,814,730 to Karstedt; U.S. Pat. No. 3,928,629 to Chandra; U.S. Pat. No. 3,989,668 to Lee, et al.; U.S. Pat. No. 4,766,176 to Lee, et al.; U.S. Pat. No. 4,784,879 to Lee, et al.; U.S. Pat. No. 5,017,654 to Togashi; U.S. Pat. No. 5,036,117 to Chung, et al.; and U.S. Pat. No. 5,175,325 to Brown; and EP 0 347 895 A to Togashi, et al. Hydrosilylation reaction catalysts are commercially available, for example, SYL-OFF™ 4000 Catalyst, SYL-OFF 4500 Catalyst, and SYL-OFF 2700 Catalyst are available from Dow Silicones Corporation (SYL-OFF is a trademark of Dow Silicones Corporation).

The amount of the hydrosilylation reaction catalyst used will depend on various factors including the selection of the polyorganohydrogensiloxane and the aliphatically unsaturated polydiorganosiloxane component, and their respective contents of silicon bonded hydrogen atoms (SiH) and aliphatically unsaturated groups, and the content of the platinum group metal in the catalyst selected, for example, the amount of hydrosilylation reaction catalyst is sufficient to catalyze hydrosilylation reaction of SiH and aliphatically unsaturated groups, alternatively the amount of catalyst is sufficient to provide 1 part per million (ppm) or more, and can be 5 ppm or more, 10 ppm or more, 20 ppm or more, or even 30 ppm or more, while at the same time is generally 1,000 ppm or less, and can be 500 ppm or less, 300 ppm or less, 130 ppm or less, or even 100 ppm or less, of the platinum group metal, based on combined weights of components (A), (B), (C), (D) and (E). Alternatively, when the hydrosilylation reaction catalyst comprises a platinum-organosiloxane complex, the amount of hydrosilylation reaction catalyst may be 0.01 wt % to 5 wt %, 0.1 wt % to 4.0 wt %, 0.3 wt % to 3.0 wt %, or 0.4 wt % to 2.0 wt %, based on combined weights of components (A), (B), (C), (D) and (E).

The curable composition of the present invention may comprise or be free of (E) a condensation reaction catalyst (component (E)). Condensation reaction catalysts are known in the art and are commercially available, such as condensation reaction catalysts described in US20210277187A1. Specific examples of suitable condensation reaction catalysts include benzoic acid, acetic acid, propionic acid, citric acid, or mixtures thereof. The condensation reaction catalyst is present in an amount sufficient to catalyze condensation reaction of hydroxyl groups in the hydroxyl-terminated polydiorganosiloxane gum and in the uncapped MQ resin, for example, the condensation reaction catalyst may be present at a concentration of 0.001 wt % or more, and can be 0.01 wt % or more, 0.03 wt % or more, 0.05 wt % or more, 0.08 wt % or more, 0.09 wt % or more, or even 0.10 wt % or more, while at the same time is generally 0.5 wt % or less, and can be 0.25 wt % or less, 0.20 wt % or less, 0.15 wt % or less, 0.13 wt % or less, 0.12 wt % or less, or even 0.11 wt % or less, based on combined weights of components (A), (B), (C), (D) and (E).

Desirably, the curable composition of the present invention comprises, based on combined weights of components (A), (B), (C), (D) and (E), 5 wt % to 16 wt % of the aliphatically unsaturated polydiorganosiloxane polymer (A1) and 20 wt % to 30 wt % of the hydroxyl-terminated polydiorganosiloxane gum (A3), where the content of vinyl groups ("Vi content") in the curable composition is 0.03 wt % to 0.08 wt %, the (B2):(B1) ratio is 0.55 to 5, and the molar ratio of silicon bonded hydrogen atoms to vinyl groups is 10 to 30; and more desirably, the (A3):(A1) ratio is 1 to 5, and/or the R/P ratio is 1.2 to 1.5.

The curable composition of the present invention may comprise or be free of (F) a hydrosilylation reaction inhibitor (component (F)), which is useful for altering the rate of hydrosilylation reaction, as compared to reaction rate of the same composition but with the inhibitor omitted. Examples of suitable inhibitors include acetylenic alcohols such as 2-methyl-3-butyn-2-ol, dimethyl hexynol, 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol (ETCH); a silylated acetylenic alcohol, such as those prepared by methods known in the art, for example, U.S. Pat. No. 6,677,407 to Bilgrien, et al. discloses silylating an acetylenic alcohol described above by reacting it with a chlorosilane in the presence of an acid receptor; cycloalkenylsiloxanes such as methylvinylcyclosiloxanes exemplified by 1,3,5,7-tetramethyl-1,3,5,7-tetravinylcyclotetrasiloxane, and 1,3,5,7-tetramethyl-1,3,5,7-tetrahexenylcyclotetrasiloxane; ene-yne compounds such as 3-methyl-3-penten-1-yne and 3,5-dimethyl-3-hexen-1-yne; triazoles such as benzotriazole; phosphines; mercaptans; hydrazines; amines such as tetramethyl ethylenediamine, 3-dimethylamino-1-propyne, n-methyl-propargylamine, propargylamine, and 1-ethynylcyclohexylamine; fumarates including dialkyl fumarates such as diethyl fumarate, dialkenyl fumarates such as diallyl fumarate, dialkoxyalkyl fumarates; maleates such as diallyl maleate and diethyl maleate; nitriles; ethers; or mixtures thereof. Desirably, the inhibitor is ETCH. The inhibitor may be present at a centration of zero or more, and can be greater than zero, 0.001 wt % or more, 0.01% wt % or more, 0.02 wt % or more, 0.04 wt % or more, 0.05 wt % or more, or even 0.1 wt % or more, while at the same time is generally 5 wt % or less, and can be 1 wt % or less, 0.5 wt % or less, 0.3 wt % or less, or even 0.25 wt % or less, and can be 0.001 wt % to 5 wt %, based on combined weights of components (A), (B), (C), (D) and (E).

The curable composition of the present invention may comprise or be free of (G) an anchorage additive (component (G)). Suitable anchorage additives for component (G) may include silane coupling agents such as methyltrimethoxysilane, vinyltrimethoxysilane, allyltrimethoxysilane, 3-methacryloxypropyltrimethoxysilane, 3-aminopropyltrimethoxysilane, N-(2-aminoethyl)-3-aminopropyltrimethoxysilane, bis(trimethoxysilyl)propane, and bis(trimethoxysilylhexane; and mixtures or reaction mixtures of said silane coupling agents. Alternatively, the anchorage additive may be tetramethoxysilane, be tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltriethoxysilane, ally ltriethoxysilane, 3-glycidoxypropyltrimethoxysilane, 3-glycidoxypropyltriethoxysilane, or 3-methacryloxypropyl trimethoxysilane.

Other suitable anchorage additives are exemplified by a reaction product of a vinyl alkoxysilane and an epoxy-functional alkoxysilane; a reaction product of a vinyl acetoxysilane and epoxy-functional alkoxysilane; and a combination (e.g., physical blend and/or a reaction product) of a polyorganosiloxane having at least one aliphatically unsaturated hydrocarbon group and at least one hydrolyzable group per molecule and an epoxy-functional alkoxysilane (e.g., a combination of a hydroxy-terminated, vinyl functional polydimethylsiloxane with glycidoxypropyltrimethoxysilane).

Exemplary anchorage additives are known in the art, such as in U.S. Pat. No. 9,562,149; U.S. Patent Application Publication Number 2003/0088042, U.S. Patent Application Publication Number 2004/0254274, U.S. Patent Application Publication Number 2005/0038188; U.S. Patent Publication 2012/0328863 at paragraph [0091] and U.S. Patent Publication 2017/0233612 at paragraph [0041]; and European Patent 0 556 023. Anchorage additives are commercially available. For example, SYL-OFF™ 9250, SYL-OFF 9176, SYL-OFF 297 and SYL-OFF 397 are available from Dow Silicones Corporation of Midland, Michigan, USA. Other exemplary anchorage additives include (G-1) vinyltriacetoxysilane, (G-2) glycidoxypropyltrimethoxysilane, and (G-3) a combination of (G-1) and (G-2). This combination (G-3) may be a mixture and/or a reaction product.

The amount of the anchorage additive depends on various factors including the type of substrate to which the curable composition will be applied to. For example, the anchorage additive (G) may be present at a concentration of zero or more, and can be 0.01 wt % or more, 0.1% or more, 0.5% or more, or even 0.6% or more, while at the same time is generally 5% or less, and can be 4% or less, 3% or less, 2% or less, 1.5% or less, or even 1% or less, and can be 0.01 wt % to 5 wt %, based on combined weights of components (A), (B), (C), (D) and (E).

The curable composition may comprise or be free of (H) an olefinic reactive diluent (component (H)). The olefinic reactive diluent (also as "reactive diluent") comprises a hydrocarbon compound of 8 to 18 carbon atoms and at least one aliphatic unsaturation per molecule. The olefinic reactive diluent may be linear. The reactive diluent may comprise 12 to 16 carbon atoms or 14 to 16 carbon atoms. The reactive diluent may be linear or branched. The aliphatic unsaturation may be pendant or terminal. Suitable reactive diluents for component (H) may be any one or any combination of more than one of the following: (H-1) n-dodecene; (H-2) n-tetradecene; (H-3) n-hexadecene; (H-4) n-octadecene; (H-5) any branched isomer of any of (H-1), (H-2), (H-3), and/or (H-4); and (H-6) combinations of two or more of (H-1), (H-2), (H-3), (H-4), and/or (H-5). The reactive diluent may have a double bond at a terminal position. Desirably, the reactive diluent is selected from n-tetradecene, n-hexadecene, or mixtures thereof. The amount of the olefinic reactive diluent may be zero or more, and can be greater than zero, 0.5% or more, 0.7% or more, 1% or more, 1.2% or more, 1.5% or more, 1.75% or more, or even 1.9% or more, while at the same time is generally less than 10%, and can be 8% or less, 6% or less, 4% or less, 2% or less, or even 1.8% or less, based on combined weight of components (A), (B), (C), (D) and (E).

The curable composition may comprise or be free of (I) a solvent (component (I)). The solvent may be an organic solvent such as a hydrocarbon, a ketone, an ester acetate, an ether, and/or a cyclic siloxane having an average degree of polymerization from 3 to 10. Suitable hydrocarbons for the solvent can be an aromatic hydrocarbon such as benzene, toluene, or xylene; an aliphatic hydrocarbon such as hexane, heptane, octane, or iso-paraffin; or combinations thereof. Desirably, the solvent may be a glycol ether such as propylene glycol methyl ether, dipropylene glycol methyl ether, propylene glycol n-butyl ether. Suitable ketones include acetone, methyl ethyl ketone, or methyl isobutyl ketone. Suitable ester acetates include ethyl acetate or isobutyl acetate. Suitable ethers include diisopropyl ether or 1,4-dioxane. Suitable cyclic siloxanes having a degree of polymerization from 3 to 10 or from 3 to 6, include hexamethylcyclotrisiloxane, octamethylcyclotetrasiloxane, and/or decamethylcyclopentasiloxane. Desirably, the solvent can be selected from benzene, toluene, xylene, heptane, ethyl benzene, ethyl acetate, or combinations of two or more thereof.

The amount of the solvent will depend on various factors including the type of solvent selected and the amount and type of other components selected for the curable composition. However, the amount of solvent may range from zero to 90%, and can be zero to 70%, 20% to 70%, or 30% to 70%, based on combined weights of all components in the curable composition. The solvent can be added during preparation of the curable composition, for example, to aid mixing and delivery of one or more components described above. All or a portion of the solvent may be added with one or more of the other components. For example, the polyorganosilicate resin may be dissolved in a solvent before combination with the other components in the curable composition. All or a portion of the solvent may optionally be removed after the curable composition is prepared, such that the resulting curable composition will be solventless, i.e., will contain no solvent or may contain trace amounts of residual solvent from delivery of a component in the curable composition described above.

The curable composition of the present invention may comprise or be free of (J) a neutralizer (component (J)), which can be useful for accelerating condensation reaction. Suitable neutralizers may include silyl phosphonates, silyl phosphates, or mixtures thereof. Exemplified neutralizers are a bis(trimethylsilyl)phosphonate such as bis(trimethylsilyl)vinylphosphonate, bis(trimethylsilyl)phosphate, or mixtures thereof. The concentration of the neutralizer may be zero or more, and can be greater than zero, 0.001 wt % to 0.020 wt %, 0.005 wt % to 0.019 wt %, 0.01 wt % to 0.018 wt %, 0.012 wt % to 0.017 wt %, based on combined weights of components (A), (B), (C), (D) and (E).

The present invention also relates to a process for preparing the curable composition described above. The process may comprise the following steps: step i) mixing the hydroxyl-terminated polydiorganosiloxane gum (A3), the uncapped resin (B2), and the condensation reaction catalyst (E); thereby forming a mixture, i.e., a condensation curable formulation; and step ii) further mixing the resulting mixture obtained from step i) with the aliphatically unsaturated polydiorganosiloxane polymer (A1), the capped resin (B1), the SiH crosslinker (C), and the hydrosilylation reaction catalyst (D). Optional components such as the hydrosilylation reaction inhibitor (F), the anchorage additive (G), the olefinic reactive diluent (H), the solvent (I), and/or the neutralizer (J) can be added in the step i), step ii), or both steps i) and ii).

In step i) of the process, optional components such as the solvent (I) and the neutralizer (J) if present may be added, typically prior to adding the condensation reaction catalyst (E). The step i), e.g., for preparation of the condensation curable formulation can be carried out through blending at room temperature or elevated temperatures such as ranging from 125 to 155° C., for example, mixing the hydroxyl-terminated polydiorganosiloxane gum (A3) and the uncapped resin (B2), and optionally, the solvent (I) and/or the neutralizer (J), followed by addition of the condensation reaction catalyst (E), and then heating at a temperature such that condensation reaction partially occurs, for example, at temperatures ranging from 125 to 155° C. or 145 to 155° C. for 30 seconds to 30 hours. Alternatively, step i) can be carried out through cold-blending process, including mixing the hydroxyl-terminated polydiorganosiloxane gum (A3) and the uncapped resin (B2), and optionally the solvent at room temperature, followed by addition of the condensation reaction catalyst.

After completing step i), the rest of the components (i.e., a hydrosilylation curable formulation) of the curable composition that comprise the aliphatically unsaturated polydiorganosiloxane polymer (A1), the capped resin (B1), the SiH crosslinker (C), and the hydrosilylation reaction catalyst (D), are further mixed with the mixture from step i) to form the curable composition of the present invention. Desirably, in step ii), the aliphatically unsaturated polydiorganosiloxane polymer (A1) and the capped resin (B1) are firstly mixed with the mixture obtained from step i), followed by addition of the SiH crosslinker (C), and then the hydrosilylation reaction catalyst (D). Other optional components such as the inhibitor, the anchorage additive, the olefinic reactive diluent, and the solvent can be added, desirably, prior to adding the SiH crosslinker. The inhibitor may be added before the hydrosilylation reaction catalyst. Mixing in steps i) and ii) of the process for preparing the curable composition can be conducted by conventional means at room temperature for sufficient time until homogeneous.

The curable composition described above or a curable composition prepared from the above process is suitable for use in forming a silicone pressure sensitive adhesive comprising a cured product of the curable composition, i.e., a pressure sensitive adhesive formed by curing the curable composition via hydrosilation reaction and condensation reaction simultaneously. The curable composition of the present invention is a hydrosilation reaction and condensation reaction curable composition.

The present invention also relates to an adhesive article comprising the silicone pressure sensitive adhesive residing on at least one surface of a substrate. The adhesive article can be prepared by a method that comprises: (i) applying the curable composition to at least one surface of a substrate, and (ii) curing the curable composition to form the silicone pressure sensitive adhesive (also as "cured PSA") on the surface of the substrate, thereby forming the adhesive article. The curable composition can be applied to both surfaces of the substrate. Applying the curable composition to the substrate can be performed by any convenient means such as gravure coater, comma coater, offset coater, offset-gravure coater, roller coater, reverse-roller coater, air-knife coater, slot die, or curtain coater. The substrate can be any material that can withstand the curing conditions as described below used to cure the curable composition to form the silicone pressure sensitive adhesive on the substrate. For example, any substrate that can withstand heat treatment at a temperature equal to or greater than 120 degree Celsius (C), alternatively 150° C. is suitable. Examples of materials suitable for such substrates including polymeric films and/or foams, which may be comprised of polyimide (PI), polyetheretherketone (PEEK), polyethylene naphthalate (PEN), liquid-crystal polyacrylate, polyamide-imide (PAI), polyether sulfide (PES), polyethylene terephthalate (PET), polycarbonate (PC), polymethylmethacrylate (PMMA), thermoplastic polyurethane (TPU), thermoplastic elastomer (TPE), polyethylene (PE), or polypropylene (PP). The thickness of the substrate is not critical, however, the thickness may be 5 micrometers (μm) to 300 μm, alternatively 10 μm to 200 μm. Desirably, the substrate is selected from the group consisting of PET, PE, PU, PI, TPE, and TPU.

Curing the curable composition may be performed by any conventional means such as heating at temperatures depending on coating lines used, typically in a range of 100 to 240° C., 110 to 160° C., or 120 to 150° C. for a time sufficient to cure the curable composition, e.g., via hydrosilation reaction and condensation reaction simultaneously. Desirably, curing can be conducted at 120 to 160° C. and curing time can be 1 second to 20 min, 2 seconds to 5 min, or 5 seconds to 2 min. The above heating step and curing step can be performed in an oven, e.g., an air circulation oven or tunnel furnace or by passing the coated film around heated cylinders.

To improve bonding of the silicone pressure sensitive adhesive described above to the substrate, the method of making the adhesive article may optionally further comprise treating the substrate before applying the curable composition. Treating the substrate may be performed by any convenient means, such as applying a primer, or subjecting the substrate to corona-discharge treatment, etching, or plasma treatment before applying the curable composition or the silicone pressure sensitive adhesive to the substrate.

The method of making the adhesive article may optionally further comprise (iii) applying a low-adhesion silicone protective film ("low-adhesion Si-PF") to the silicone pressure sensitive adhesive (that is obtained by curing the curable composition described above) opposite the substrate, e.g., to protect the silicone pressure sensitive adhesive before use of the adhesive article, such that the silicone pressure sensitive adhesive is between and in contact with the substrate and a low-adhesion silicone pressure sensitive adhesive ("low-adhesion PSA") of the low-adhesion Si-PF. The low-adhesion Si-PF typically refers to a protective film comprising a second substrate which can be same or different from the substrate described above and the low-adhesion Si-PSA that is other than the silicone pressure sensitive adhesive of the present invention described above and that has an adhesion to stainless steel (SUS) of <10 g/in as determined using an Adhesion/Release Tester of AR 1500 in accordance with ASTM D3330. The low-adhesion Si-PF may be laminated directly onto the silicone pressure sensitive adhesive of the present invention during manufacturing processes such as die-cutting protection or masking protection applications in electronic applications. The low-adhesion Si-PSA in the low-adhesion Si-PF can be prepared by curing (a) a low-adhesion silicone PSA composition, or a mixture of the low-adhesion silicone PSA composition (a) with (b) a middle- to high-adhesion silicone PSA composition; such that the resulting low-adhesion PSA has an adhesion to SUS of <10 g/in. "Low-adhesion silicone PSA composition" refers to a silicone PSA composition that can provide a cured product of an adhesion to SUS of <10 g/in. "Middle- to high-adhesion silicone PSA composition" refers to a silicone PSA composition that can provide a cured product with an adhesion to SUS of >10 g/in. Suitable low-adhesion silicone PSA compositions may include, for example, DOWSIL™ 7626 Adhesive, DOWSIL 7636 Adhesive, DOWSIL 7646 Adhesive, DOWSIL 7666 Adhesive, DOWSIL 7647 Adhesive, DOWSIL 7660 Adhesive, DOWSIL 7645 Adhesive, DOWSIL 7651 Adhesive, or mixtures thereof. Suitable middle- to high-adhesion silicone PSA compositions may include, for example, DOWSIL 7652 Adhesive, DOWSIL 7667 Adhesive, DOWSIL 7657 Adhesive, DOWSIL 7685 Adhesive, DOWSIL 7663 Adhesive, DOWSIL 7695 Adhesive, DOWSIL 7687 Adhesive, or mixtures thereof. The coat weight of the low-adhesion silicone PSA composition above or its combination with one or more of the middle- to high-adhesion silicone PSA composition above can be sufficient to provide a thickness of the low-adhesion Si-PSA of 1 to 100 μm, 5 to 50 μm, or 9 to 11 μm.

The coat weight of the curable composition of the present invention can be sufficient to provide a thickness of cured PSA (i.e., the silicone pressure sensitive adhesive) of 1 to 100 μm, 5 to 50 μm, 10 to 20 μm, or 14 to 17 μm. The curable composition of the present invention can provide the silicone pressure sensitive adhesive with desirable adhesive properties including, for example, adhesion to the low-adhesion Si-PF above of ≥400 g/in after 20 min at room temperature, or after aging the silicone pressure sensitive adhesive on the low-adhesion Si-PF at 70° C. and 80% relative humidity (RH) for 3 days, by peeling the low-adhesion Si-PF with an angle of 180° at a speed of 300 millimeters per minute (mm/min); or an adhesion to SUS of ≥400 g/in (further details provided under Peel Adhesion Test below). The high adhesions make the interface between the silicone pressure sensitive adhesive and substrates (adherends) strong enough to resist the delamination after manufacturing process such as masking or protection.

Figure 1:
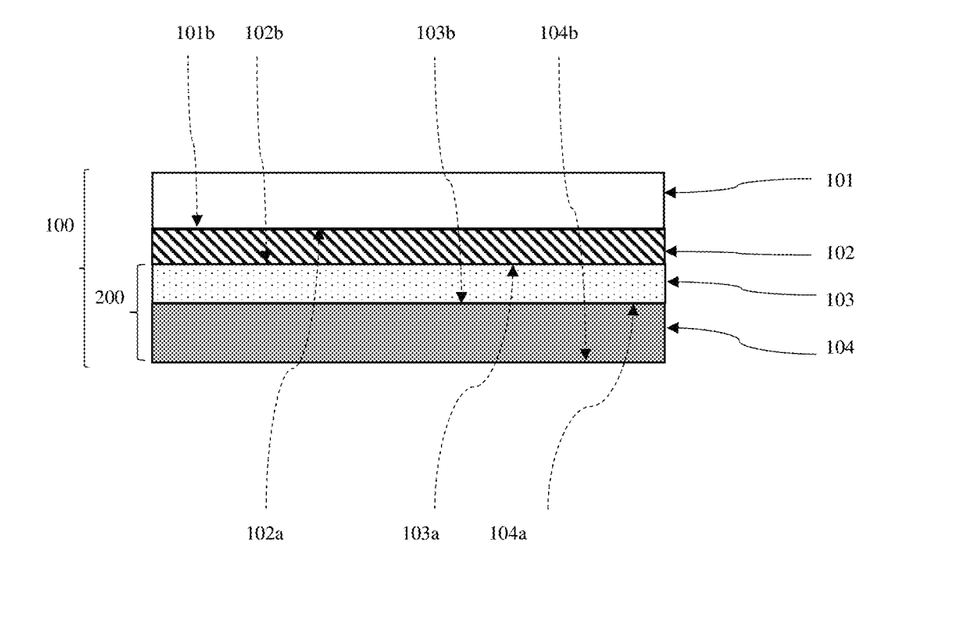
FIG. 1 shows a partial cross section of an adhesive article 100. The adhesive article comprises a pressure sensitive adhesive 102 prepared by curing a curable composition described herein on a surface 101 of a film substrate 101. The article 100 further includes a low-adhesion silicone protective film 200 adhered to an opposing surface of the pressure sensitive adhesive 102.

FIG. 1 shows a partial cross section of an adhesive article (100). The component (100) includes a silicone pressure sensitive adhesive (Si-PSA) (102) having a surface (102a) and an opposing surface (102b). The Si-PSA (102) may be as described above for the silicone pressure sensitive adhesive of the present invention. The opposing surface (102b) of the silicone pressure sensitive (102) adheres to the surface (103a) of a low-adhesion silicone PSA (103) with an adhesion of ≥400 g/in as measured by the test method described in the EXAMPLES below. The Si-PSA (102) may have a thickness of 10 μm to 200 μm. The Si-PSA (102) adheres to a first substrate (101) having a surface (101a) and an opposing surface (101b). The surface (102a) of the Si-PSA (102) contacts the opposing surface (101b) of the first substrate (101). The Si-PSA (102) adheres to the low-adhesion Si-PSA (103) having a surface (103a) and an opposing surface (103b). The low-adhesion Si-PSA (103) may have a thickness of 10 μm to 200 μm. The opposing surface (102b) of the Si-PSA (102) contacts the opposing surface (103b) of the low-adhesion Si-PSA (103). The low-adhesion Si-PSA (103) adheres to a second substrate (104) having a surface (104a) and an opposing surface (104b). The surface (103b) of the low-adhesion Si-PSA (103) contacts the opposing surface (104a) of the second substrate (104). A low-adhesion silicone protective film (Si-PF) (200) consists of the low-adhesion Si-PSA (103) and the second substrate (104). The low-adhesion Si-PF (200) may be as described above. The first substrate (101) and the second substrate (104) may be the same or different as described above and may each independently have a thickness of 10 μm to 200 μm.

EXAMPLES

Some embodiments of the invention will now be described in the following Examples, where all amounts, ratios, and percentages herein are by weight, unless otherwise specified. Table 1 lists the materials for use in the curable compositions of the samples described herein below. Note: "Vi" represents vinyl, "Me" represents methyl and D represents $Me_2SiO_{2/2}$. $M^{OH}$ represents a monofunctional siloxane unit of formula $((HO)Me_2SiO_{1/2})$; $M^{Vi}$ represents a monofunctional siloxane unit of formula $(Me_2ViSiO_{1/2})$. DOWSIL™, SILASTIC™, and XIAMETER™ are trademarks of Dow Silicones Corporation.

TABLE 1

Materials for use as components of curable compositions

| Component | Chemical Composition | Commercial Source |
|---|---|---|
| Vi Gum 1 | Bis-dimethylvinylsiloxy-terminated polydimethylsiloxane gum with the average unit formula of $M^{Vi}D_{5836}M^{Vi}$, having the plasticity of 60 mil (1.52 mm) and vinyl content = 0.012 wt % | Available from Dow Silicones Corporation |
| Vi Gum 2 | Bis-dimethylvinylsiloxy-terminated poly(dimethyl/methylvinyl) siloxane gum, having the plasticity of 58.5 mil and vinyl content = 0.065 wt % | Commercially available from various sources |
| Vi Gum 3 | Bis-dimethylvinylsiloxy-terminated polydimethylsiloxane gum, having the plasticity of 52 mil (1.52 mm) and vinyl content = 0.018 wt % | Commercially available from various sources |
| Vi Polymer 1 | Bis-vinyldimethylsiloxy terminated polydimethylsiloxane with degree of polymerization (DP) = 150, Mn = 11,500 g/mol, and vinyl content = 0.45 wt %, and viscosity = 450 mPa·s at 25° C. | Available as XIAMETER ™ RBL-9119 Polymer from Dow Silicones Corporation |
| Vi Polymer 2 | Bis-vinyldimethylsiloxy terminated polydimethylsiloxane with DP = 320, Mn = 22,000 g/mol, vinyl content = 0.22 wt %, and viscosity = 2,000 mPa·s at 25° C. | Commercially available from various sources |
| Vi Polymer 3 | Bis-vinyldimethylsiloxy terminated polydimethylsiloxane with DP = 830, Mn = 62,000 g/mol, vinyl content = 0.088 wt %, and viscosity = 55,000 mPa·s at 25° C. | Available as SILASTIC ™ SFD-128 polymer from Dow Silicones Corporation |
| Vi Polymer 4 | Tri-methylsiloxy terminated poly(dimethyl siloxane/vinylmethylhydrogensiloxane) with DP = 1143, Mn = 84,788 g/mol, and vinyl content = 0.5036 wt%, and viscosity = 38,000 mPa·s at 25° C. | Commercially available from various sources |
| Vi Polymer 5 | Bis-vinyldimethylsiloxy terminated polydimethylsiloxane with DP = 1015, Mn = 75,148 g/mol, and vinyl content = 0.2875 wt %, and viscosity = 70,000 mPa·s at 25° C. | Commercially available from various sources |
| OH Gum 1 | Bis-hydroxyl-terminated polydimethylsiloxane gum with the average unit formula of $M^{OH}D_eM^{OH}$, where subscript e is sufficient to give the gum a plasticity of 53 mil (1.35 mm) | Commercially available from various sources |
| OH Gum 2 | Bis-hydroxyl-terminated polydimethylsiloxane gum with the average unit formula of $M^{OH}D_eM^{OH}$, where subscript e is sufficient to give the gum a plasticity of 60 mil (1.52 mm) | Available as XIAMETER ™ RBG-0910 Gum from Dow Silicones Corporation |
| Uncapped MQ Resin | Uncapped polymethylsilicate resin with M:Q ratio = 0.72:1.00, Mn = 4,700 g/mol by GPC, Mw = 21,700 g/mol, hydroxyl content = 3.4 wt % on a resin solids basis, and non-volatile content (NVC) = 70% | Available from Dow Silicones Corporation |
| Capped MQ Resin 1 | Methyl capped polymethylsilicate resin with M:Q ratio = 0.96:1.00, Mn = 4,700 g/mol, Mw = 17,000 g/mol, hydroxyl content = 1.0 wt % on a resin solids basis, and NVC = 62-66% | Available from Dow Silicones Corporation |
| Capped MQ Resin 2 | Methyl capped polymethylsilicate resin with M:Q ratio = 0.96:1.00, Mn = 3,700 g/mol, Mw = 16,800 g/mol, hydroxyl content = 1.0 wt % on a resin solids basis, and NVC = 66% | Available from Dow Silicones Corporation |
| Capped MQ Resin 3 | Methyl capped polymethylsilicate resin with M:Q ratio = 1.04:1.00, Mn = 2,800 g/mol, Mw = 7,400 g/mol, hydroxyl content = 0.9 wt % on a resin solids basis, and NVC = 70% | Available from Dow Silicones Corporation |
| SiH Crosslinker 1 | Trimethylsiloxy-terminated poly(dimethylsiloxane/methylhydrogensiloxane) with SiH content = 1.6% | Available as DOWSIL ™ 6-3570 Polymer from Dow Silicones Corporation |
| SiH Crosslinker 2 | Trimethylsiloxy-terminated poly(dimethylsiloxane/methylhydrogensiloxane) with SiH content = 0.76% | Available as SYL-OFF ™ 7028 Crosslinker from Dow Silicones Corporation. |
| Anchorage Additive | Reaction products of vinyltriacetoxysilane and glycidoxypropyltrimethoxysilane | Available as SYL-OFF ™ 297 Anchorage Additive from Dow Silicones Corporation. |
| Pt catalyst | A vinyl end-blocked polydimethylsiloxane diluted platinum complex of 1,3-diethenyl-1,1,2,2-tetramethyldisiloxane having a platinum concentration of 5,200 ppm | Available as SYL-OFF 4000 Catalyst from Dow Silicones Corporation |
| Inhibitor 1 | 1-ethynyl-1-cyclohexanol ($C_8H_{12}O$) (ETCH) | Commercially available from various sources |
| Inhibitor 2 | Diallyl maleate ($C_{10}H_{12}O_4$) | Commercially available from various sources |
| Inhibitor 3 | METHYL BUTYNOL ($C_5H_8O$) | Commercially available from various sources |
| Olefinic Reactive Diluent 1 | n-Tetradecene (n—$C_{12}H_{25}CH=CH_2$) | Commercially available from various sources |
| Olefinic Reactive Diluent 2 | n-Hexadecene (n—$C_{14}H_{27}CH=CH_2$) | Commercially available from various sources |
| Condensation Reaction Catalyst | BENZOIC ACID ($C_6H_5CO_2H$) | Available from Dow Silicones Corporation |
| Neutralizer | SILYL PHOSPHATE | Available from Dow Silicones Corporation |

TABLE 1-continued

Materials for use as components of curable compositions

| Component | Chemical Composition | Commercial Source |
|---|---|---|
| PET | Polyethylene terephthalate film, 50 micrometers (μm) thick | Available from Hangzhou Dahua Plastics Industry Co., Ltd. |
| SUS | Stainless steel | Available from Cheminstruments |
| Low-adhesion Si-PF* | Low-adhesion silicone protective film was prepared by applying a formulation of DOWSIL 7657: DOWSIL 7647: DOWSIL 7028: DOWSIL 297: DOWSIL 4000 in amounts of 10:90:2.0:1.5:1.8 parts by weight on a 50 μm PET, and curing at 140° C. for 2 min to form a 10 μm-thick dry low-adhesion silicone PSA on the PET. | DOWSIL ™ products used for preparing the cured low-adhesion silicone PSA are all available from Dow Silicones Corporation. |

*The low-adhesion Si-PF has an adhesion to SUS of 1 g/in as determined using an adhesion/release tester of AR-1500 according to ASTM D3330.

Formulations for curable compositions samples are in Tables 2 and 3, with the amount of each component reported in grams (g). The curable compositions were prepared by the following steps:

Step 1): preparation of a condensation curable formulation through 'cold blending' or 'bodying' process. CE-A, CE-F, IE-7 and IE-8 were prepared by 'bodying' process and other CEs and IEs were prepared by 'cold blending' process as described below.

"Bodying" process: The (A3) OH Gum, (B2) Uncapped MQ Rein, (I) Solvent, and (J) Neutralizer were added together into a 500 mL three-neck round bottom reaction flask at room temperature. The resulting mixture was stirred at 250 revolutions per minute (rpm) with a stainless steel stir paddle in the middle neck for 20 min, followed by addition of the (E) Condensation Reaction Catalyst during stirring. Another neck is connected to a dean-stark trap and then condenser with city water cooling capability. The last neck contains a thermometer and nitrogen sweep adaptor closing the system. Finally, the three-neck flask with the mixture inside was mounted on a heating mantle with temperature control to reach a reaction temperature of 145° C. The reaction continued for 3 hours starting from the beginning of refluxing. The resulting formulation was then cooled down to room temperature for use later.

"Cold blending" process: The (A3) OH Gum, (B2) Uncapped MQ Resin, and (I) Solvent were added together into a 500 mL three-neck round bottom reaction flask at room temperature and mixed for 30 seconds at 3500 rpm until homogeneous. And then (E) Condensation Reaction Catalyst was further added and mixed for 30 seconds at 3500 rpm until homogeneous. The resulting formulation was for use later.

Step 2): the condensation curable formulation obtained from step 1) above was added the (A1) Vi Polymer and (B1) Capped MQ resin and mixed until homogeneous. Then the (F) Inhibitor, (G) Anchorage Additive, (H) Olefinic reactive diluent and (I) Solvent were further added and mixed until homogeneous. The (C) SiH Crosslinker was then further added and mixed until homogeneous, followed by addition of the (D) Pt Catalyst and mixing in the same way until homogeneous to obtain the curable composition samples. Mixing the components in step i) and step ii) was conducted at 500 rpm for 300 seconds at room temperature.

Each curable composition sample obtained above was applied to 50 μm thick PET substrate with a thickness to give the obtained silicone pressure sensitive adhesive (i.e., cured product of the curable composition) with a thickness of 15.5±1.5 μm after curing in an oven at 150° C. for 2 min. After curing, the resulting tape samples were characterized for adhesion properties according to the peel adhesion test described below. Characterization results are given below in Tables 4 and 5.

TABLE 2

Inventive examples for curable compositions

| | Component | | IE-1 | IE-2 | IE-3 | IE-9 | IE-8 | IE-6 | IE-4 | IE-5 | IE-7 |
|---|---|---|---|---|---|---|---|---|---|---|---|
| A | A1-Vi Polymer | Vi Polymer 1 | 15.68 | 12.54 | 6.27 | 12.54 | 3.04 | 0.00 | 0.00 | 0.00 | 9.11 |
| | | Vi Polymer 4 | 0.00 | 0.00 | 0.00 | 0.00 | 0.00 | 6.60 | 6.60 | 3.30 | 0.00 |
| | | Vi Polymer 5 | 0.00 | 0.00 | 0.00 | 0.00 | 0.00 | 12.20 | 12.20 | 6.10 | 0.00 |
| | A3-OH Gum | OH Gum 1 | 13.99 | 16.79 | 22.38 | 16.79 | 0.00 | 22.38 | 22.38 | 25.18 | 0.00 |
| | | OH Gum 2 | 0.00 | 0.00 | 0.00 | 100.20 | 21.98 | 0.00 | 0.00 | 0.00 | 17.09 |
| B | B2-Uncapped MQ Resin | | 22.52 | 27.02 | 36.03 | 119.02 | 41.40 | 36.03 | 76.03 | 40.54 | 32.20 |
| | B1-Capped Resin | Capped MQ Resin 1 | 0.00 | 0.00 | 0.00 | 100.00 | 7.66 | 36.16 | 1.16 | 25.58 | 22.98 |
| | | Capped MQ Resin 2 | 43.09 | 34.47 | 17.24 | 34.47 | 0.00 | 0.00 | 0.00 | 0.00 | 0.00 |
| C | SiH Crosslinker | SiH Crosslinker 1 | 3.54 | 2.83 | 1.41 | 2.83 | 0.00 | 0.00 | 0.00 | 0.00 | 0.00 |
| | | SiH Crosslinker 2 | 0.50 | 0.60 | 0.80 | 0.60 | 1.11 | 0.80 | 0.80 | 0.40 | 1.34 |
| D | Pt Catalyst | | 1.20 | 1.13 | 1.00 | 6.08 | 0.93 | 1.77 | 1.78 | 1.54 | 1.06 |
| E | Condensation Reaction Catalyst | | 0.08 | 0.09 | 0.12 | 0.09 | 0.16 | 0.12 | 0.12 | 0.14 | 0.12 |
| G | Anchorage Additive | | 0.78 | 0.74 | 0.65 | 0.74 | 0.60 | 0.92 | 0.93 | 0.80 | 0.69 |
| F | Inhibitor 1 | | 0 | 0 | 0 | 0 | 0 | 20 | 20 | 10 | 0 |
| | Inhibitor 2 | | 0.15 | 0.12 | 0.06 | 0.12 | 0.00 | 0.00 | 0.00 | 0.00 | 0.00 |
| | Inhibitor 3 | | 0.00 | 0.00 | 0.00 | 0.00 | 0.04 | 0.00 | 0.00 | 0.00 | 0.12 |
| H | Olefinic Reactive Diluent 1 | | 2.2 | 1.8 | 0.9 | 1.8 | 0.0 | 0.0 | 0.0 | 0.0 | 0.0 |
| | Olefinic Reactive Diluent 2 | | 0.0 | 0.0 | 0.0 | 0.0 | 0.7 | 0.0 | 0.0 | 0.0 | 2.2 |
| J | Neutralizer | | 0.00 | 0.00 | 0.00 | 0.00 | 0.01 | 0.00 | 0.00 | 0.00 | 0.01 |

TABLE 3

Comparative examples for curable compositions

| | Component | | CE-A | CE-B | CE-C | CE-D | CE-E | CE-F | CE-G | CE-H | CE-I | CE-J |
|---|---|---|---|---|---|---|---|---|---|---|---|---|
| A | A2-Vi Gum | Vi Gum 1 | 11.28 | | 0.00 | 0.00 | | 0.00 | 0.00 | 0.00 | 0.00 | 0.00 |
| | | Vi Gum 2 | 0.00 | | 4.80 | 0.00 | | 0.00 | 0.00 | 0.00 | 0.00 | 0.00 |
| | | Vi Gum 3 | 0.00 | | 2.70 | 0.00 | | 0.00 | 0.00 | 0.00 | 0.00 | 0.00 |
| | A1-Vi Polymer | Vi Polymer 1 | 0.00 | | 0.00 | 22.54 | 12.54 | 16.59 | 16.84 | 12.54 | 0.00 | 30.38 |
| | | Vi Polymer 2 | 0.00 | | 2.10 | 0.00 | | 0.00 | 0.00 | 0.00 | 0.00 | 0.00 |
| | | Vi Polymer 3 | | 27.00 | | | | | | | | |
| | A3-OH Gum | OH Gum 1 | 0.00 | | 19.59 | 16.79 | | 0.00 | 16.79 | 16.79 | 27.98 | 0.00 |
| | | OH Gum 2 | 12.21 | | 0.00 | 0.00 | 14.65 | 19.81 | 5.70 | 0.00 | 0.00 | 0.00 |
| B | B2-Uncapped MQ Resin | | 23.00 | 50.00 | 36.53 | 36.02 | 55.00 | 23.00 | 27.02 | 30.82 | 45.04 | 0.00 |
| | B1-Capped MQ Resin | Capped MQ Resin 1 | 0.00 | 5.00 | 15.00 | 10.00 | | 40.29 | 0.00 | 4.00 | 0.00 | 76.59 |
| | | Capped MQ Resin 2 | 22.86 | | 0.00 | 34.47 | | 0.00 | 34.47 | 34.47 | 0.00 | 0.00 |
| | | Capped MQ Resin 3 | 1.18 | | 0.00 | 0.00 | | 0.00 | 0.00 | 0.00 | 0.00 | 0.00 |
| C | SiH Crosslinker | SiH Crosslinker 1 | 0.00 | | 0.00 | 2.83 | | 0.00 | 2.83 | 2.83 | 0.00 | 0.00 |
| | | SiH Crosslinker 2 | 0.11 | 0.60 | 0.50 | 2.10 | 0.80 | 1.67 | 1.28 | 0.60 | 0.25 | 2.14 |
| D | Pt Catalyst | | 1.00 | 1.19 | 1.23 | 1.88 | 1.13 | 1.20 | 1.61 | 1.53 | 1.00 | 1.00 |
| E | Condensation Reaction Catalyst | | 0.09 | 0.00 | 0.11 | 0.09 | 0.00 | 0.09 | 0.09 | 0.09 | 0.15 | 0.00 |
| G | Anchorage Additive | | 0.60 | 0.62 | 0.64 | 0.74 | 0.74 | 0.78 | 0.74 | 0.74 | 0.60 | 1.00 |
| F | Inhibitor 1 | | 0 | 0 | 0.045 | 0 | 0 | 0 | 0 | 0 | 0 | 0 |
| | Inhibitor 2 | | 0.10 | 0.00 | 0.00 | 0.12 | 0.00 | 0.00 | 0.12 | 0.12 | 0.00 | 0.00 |
| | Inhibitor 3 | | 0.00 | 0.00 | 0.00 | 0.00 | 0.00 | 0.19 | 0.00 | 0.00 | 0.00 | 0.39 |
| H | Olefinic Reactive Diluent 1 | | 0.0 | 0.0 | 0.0 | 1.8 | 0.0 | 0.0 | 1.8 | 1.8 | 0.0 | 0.0 |
| | Olefinic Reactive Diluent 2 | | 0.0 | 0.0 | 0.0 | 0.0 | 0.0 | 3.7 | 0.0 | 0.0 | 0.0 | 7.4 |
| J | Neutralizer | | 0.01 | | 0.00 | 0.00 | | 0.01 | 0.00 | 0.00 | 0.00 | 0.00 |

Data Analysis and Characterization

Peel Adhesion Test

The peel adhesion test was performed according to ASTM D3330.

Each tape sample prepared as described above was tested for adhesion to adherends. The adherends were SUS and the low-adhesion Si-PF prepared above. SUS plate was first cleaned with solvent before use. The tape samples obtained above were cut into 1 inch in width, and then applied to adherends such that the silicone pressure sensitive adhesive contacted the adherends by rolling twice in each direction using a standard 2 kg test roller at a speed of 10 millimeters per second (mm/s). A peel test was performed using an adhesion/release tester model AR-1500 at a peel speed of 300 mm/min and an angle of 180°. During conducting the peel test on the adherend of the low-adhesion Si-PF, the low-adhesion Si-PF was peeled from the tape. When conducting the peel test on the adherend of the SUS, the tape was peeled from the SUS. The unit was grams/in.

"Adhesion to SUS (RT-20 min)" testing was performed on samples after contacting the silicone pressure sensitive adhesive with the SUS for 20 min at room temperature (RT, 25° C.).

"Adhesion to Si-PF (RT-20 min)" testing was performed on samples after contacting the silicone pressure sensitive adhesive with the low-adhesion Si-PF for 20 min at RT. "Aged adhesion to Si-PF (70° C.& 80% RH-3d)" testing was performed as above after aging samples at 70° C. and 80% RH for 3 days.

Notably, some samples had the silicone pressure sensitive adhesive partially or fully transferred to the adherends, so they are reported as cohesion failure ("C.F.") and some samples had adhesion values too low that could not be detected under the above testing conditions (i.e., lower than the lower detection limit of the adhesion/release tester of 1 g/cm$^2$), so they are reported as "N.A.".

Probe Tack Test

A probe test was performed using a Polyken™ Probe Tack Tester/PT-1000 according to ASTM D2979.

Table 4 contains characterization results for IEs samples. As shown in Table 4, all IEs 1-9 curable compositions can cure to form silicone pressure sensitive adhesives with desirable adhesive properties including initial adhesion to the low-adhesion Si-PF≥400 g/in at RT for 20 min and aged adhesion to Si-PF≥400 g/in after aging at 70° C.& 80% RH for 3 days. Moreover, IEs 1 to 3, 5, and 7 to 9 samples also provided adhesion to SUS≥400 g/in.

Table 5 contains characterization results for CEs samples. As shown in Table 5, CE-I (no Vi-polymer or Vi Gum), CE-A (Vi Gum instead of Vi Polymer), and CE-C (3.08 wt % of Vi-polymer) all resulted in C.F. during peeling from the Si-PF. CE-D comprising 22.1 wt % of Vi Polymer with a weight ratio of OH Gum:Vi Polymer of 0.74 resulted in an adhesion to the Si-PF of less than 400 g/in. CE-J free of OH Gum and uncapped MQ resin showed an adhesion to Si-PF<400 g/in. CE-B containing no OH Gum failed to achieve an adhesion to the Si-PF of 400 g/in or more. CE-F with uncapped MQ resin in an amount lower than the claimed content, and as a result of an undesirably low amount of uncapped MQ resin and/or a low ratio of uncapped/capped MQ resin of 0.51 showed undesirably low initial adhesion to Si-PF. CE-E containing no capped MQ resin gave low adhesion to Si-PF. CE-G and CE-H samples with R/P ratios outside the claimed ranges showed an adhesion to the Si-PF<400 g/in and cohesion failure, respectively.

TABLE 4

Characterization results for IE-1 to IE-9 samples

| Characterization | IE-1 | IE-2 | IE-3 | IE-4 | IE-5 | IE-6 | IE-7 | IE-8 | IE-9 |
|---|---|---|---|---|---|---|---|---|---|
| Wt % A1-Vi Polymer | 19.80% | 16.58% | 9.14% | 19.18% | 11.06% | 19.32% | 13.17% | 4.89% | 3.88% |
| Wt % A2-Vi Gum | 0.00% | 0.00% | 0.00% | 0.00% | 0.00% | 0.00% | 0.00% | 0.00% | 0.00% |
| Wt % A3-OH Gum | 17.67% | 22.19% | 32.64% | 22.84% | 29.62% | 23.01% | 24.66% | 35.35% | 36.20% |
| A3/A1 weight ratio | 0.89 | 1.34 | 3.57 | 1.19 | 2.68 | 1.19 | 1.87 | 7.23 | 9.33 |
| Wt % Total Vi | 0.089% | 0.075% | 0.041% | 0.069% | 0.040% | 0.070% | 0.060% | 0.022% | 0.017% |
| Wt % B1-Capped MQ Resin | 35.92% | 30.08% | 16.59% | 0.92% | 23.48% | 28.99% | 25.90% | 9.61% | 31.17% |
| Wt % B2-Uncapped MQ Resin | 19.91% | 25.01% | 36.78% | 54.30% | 33.13% | 25.92% | 32.31% | 46.61% | 25.78% |
| B2:B1 ratio (uncapped/capped MQ weight ratio) | 0.55 | 0.83 | 2.22 | 58.82 | 1.42 | 0.89 | 1.26 | 4.85 | 0.83 |
| R/P ratio (B:A ratio) | 1.49 | 1.42 | 1.28 | 1.31 | 1.40 | 1.30 | 1.54 | 1.40 | 1.42 |
| Wt % C-SiH Crosslinker | 5.10% | 4.53% | 3.23% | 0.82% | 0.47% | 0.82% | 1.94% | 1.79% | 1.06% |
| SiH/Vi mole ratio | 13.3 | 14.9 | 22.5 | 5.1 | 5.1 | 5.1 | 14.1 | 35.2 | 14.9 |
| Wt % E-Condensation Reaction Catalyst | 0.09% | 0.12% | 0.17% | 0.12% | 0.16% | 0.12% | 0.18% | 0.25% | 0.03% |
| Adhesion properties | | | | | | | | | |
| Adhesion to Si-PF (RT-20 min), g/in | 636.1 | 698.9 | 874.3 | 400.0 | 930.7 | 525.4 | 488.5 | 572.0 | 642.1 |
| Adhesion to Si-PF (70° C.&80% RH-3d), g/in | 542.4 | 591.8 | 874.0 | 538.9 | 1105.4 | 960.3 | 605.0 | 841.2 | 613.4 |
| Probe tack, gram | 17.4 | 22.3 | 73.6 | 66.2 | 177.0 | 69.3 | 64.9 | 101.0 | 40.7 |
| Adhesion to SUS (RT-20 min), g/in | 632.0 | 713.2 | 753.1 | 305.0 | 772.6 | 174.8 | 646.7 | 811.4 | 649.5 |

Wt % values are relative to the total weight of components (A), (B), (C), (D) and (E).

TABLE 5

Characterization results for CE-A to CE-J samples

| Characterization | CE-A | CE-B | CE-C | CE-D | CE-E | CE-F | CE-G | CE-H | CE-I | CE-J |
|---|---|---|---|---|---|---|---|---|---|---|
| Wt % A1-Vi Polymer | 0.00% | 39.89% | 3.08% | 22.10% | 18.54% | 19.09% | 19.40% | 15.33% | 0.00% | 32.58% |
| Wt % A2-Vi Gum | 19.89% | 0.00% | 10.98% | 0.00% | 0.00% | 0.00% | 0.00% | 0.00% | 0.00% | 0.00% |
| Wt % A3-OH Gum | 21.53% | 0.00% | 28.68% | 16.46% | 21.67% | 22.80% | 25.91% | 20.52% | 45.94% | 0.00% |
| A3:A1 weight ratio | ∞ | 0.00 | 9.33 | 0.74 | 1.17 | 1.19 | 1.34 | 1.34 | ∞ | 0.00 |
| Wt % Total Vi | 0.002% | 0.035% | 0.012% | 0.099% | 0.083% | 0.086% | 0.087% | 0.069% | 0.00% | 0.15% |
| Wt % B1-Capped MQ Resin | 28.05% | 5.76% | 17.13% | 29.95% | 0.00% | 36.17% | 26.21% | 31.62% | 0.00% | 64.06% |
| Wt % B2-Uncapped MQ Resin | 28.40% | 51.70% | 37.44% | 24.72% | 56.93% | 18.53% | 21.79% | 26.37% | 51.76% | 0.00% |
| B2:B1 ratio (uncapped/capped MQ weight ratio) | 1.01 | 8.97 | 2.19 | 0.83 | 8 | 0.51 | 0.83 | 0.83 | 00 | 0.00 |
| R/P ratio (B:A weight ratio) | 1.36 | 1.44 | 1.28 | 1.42 | 1.42 | 1.31 | 1.06 | 1.62 | 1.13 | 1.97 |
| Wt % C-SiH Crosslinker | 0.20% | 0.89% | 0.73% | 4.83% | 1.18% | 1.92% | 4.73% | 4.19% | 0.41% | 2.29% |
| SiH/Vi mole ratio | 36.5 | 10.9 | 27.0 | 14.7 | 6.1 | 9.7 | 15.0 | 14.9 | N.A. | 6.8 |
| Wt % E-Condensation Reaction Catalyst | 0.15% | 0.00% | 0.15% | 0.09% | 0.00% | 0.10% | 0.10% | 0.11% | 0.25% | 0.00% |
| Adhesion properties | | | | | | | | | | |
| Adhesion to Si-PF (RT-20 min), g/in | 649.4 (C.F.) | 55.0 | 795.9 (C.F.) | 182.7 | 16.1 | 378.8 | 344 | 524.3 (C.F.) | C.F. | 85.9 |
| Adhesion to Si-PF (70° C.&80% RH-3d), g/in | 678.2 (C.F.) | 94.6 | 958.7 (C.F.) | 94 | 19.6 | 489.7 | 355.9 | 402.6 (C.F.) | C.F. | 170.8 |
| Probe tack, gram | N.A. | 66.7 | 180.2 | 20.8 | 4.2 | 8.5 | 133.5 | 113.8 | N.A. | 18.9 |
| Adhesion to SUS (RT-20 min), g/in | C.F. | 341.3 | 640.0 | 266.2 | 46.0 | 622.1 | 361.3 | 622.3 | C.F. | 423.0 |

Wt % values are relative to the total weight of components (A), (B), (C), (D) and (E).

The invention claimed is:
1. A curable composition comprising:
(A) a polydiorganosiloxane component comprising:
(A1) greater than 3.1 weight-percent to 20 weight-percent of an aliphatically unsaturated polydiorganosiloxane polymer of formula (A-I):

(A-I)

where each $R^M$ is independently selected from the group consisting of a monovalent hydrocarbon group of 1 to 30 carbon atoms that is free of aliphatic unsaturation and a monovalent halogenated hydrocarbon group free of aliphatic unsaturation, each $R^U$ is independently an alkenyl group, and subscripts a, b, c and d have average values such that a≥0, b>0, c is zero or 1, d is zero or 1, a quantity (a+b) is 100 to 2000, and a quantity (a+c+d)≥2; and (A3) a hydroxyl-terminated polydiorganosiloxane gum of unit formula (A-III):

(A-III)

where each $R^M$ is independently selected from the group consisting of a monovalent hydrocarbon group of 1 to 30 carbon atoms that is free of aliphatic unsaturation and a monovalent halogenated hydrocarbon group free of aliphatic unsaturation; and subscript e has a value sufficient to give (A3) the hydroxyl-terminated polydiorganosiloxane gum a plasticity of 20 mil (0.51 mm) to 80 mil (2.03 mm), where plasticity is measured based on ASTM D926 by applying 1 kilogram (kg) load to a spherical sample of 4.2 grams (g) in weight for 3 minutes at 25° C. and the results are measured in thousandths of an inch (mil) and the procedure is based on ASTM D926; that is present in an amount to provide a weight ratio of the hydroxyl-terminated polydiorganosiloxane gum (A3) to the aliphatically unsaturated polydiorganosiloxane polymer (A1) of 0.89:1 to 9.33:1;

(B) a polyorganosilicate resin component comprising:

(B1) a capped resin of unit formula (B-I): $(R^M_3SiO_{1/2})_z$ $(SiO_{4/2})_o Z_f$, where each $R^M$ is independently selected from the group consisting of a monovalent hydrocarbon group of 1 to 30 carbon atoms that is free of aliphatic unsaturation and a monovalent halogenated hydrocarbon group free of aliphatic unsaturation, each Z is independently a hydrolyzable group, subscript f is zero to a value sufficient to give the capped resin a hydrolyzable group content up to 2%, and subscripts z and o have values such that o>1, z>4, and a quantity (o+z) has a value sufficient to provide the capped resin with a number average molecular weight of 500 g/mol to <7,000 g/mol;

(B2) greater than 18.53 weight-percent to 54.3 weight-percent of an uncapped resin of unit formula (B-II): $(R^M_3SiO_{1/2})_{z'}(SiO_{4/2})_{o'}Z_{f'}$, where each $R^M$ is independently selected from the group consisting of a monovalent hydrocarbon group of 1 to 30 carbon atoms that is free of aliphatic unsaturation and a monovalent halogenated hydrocarbon group free of aliphatic unsaturation, each Z is independently a hydrolyzable group, subscript f' has a value sufficient to give the uncapped resin a hydrolyzable group content of greater than 3% to 10%, and subscripts z' and o' have values such that o'>1, z'>4, and a quantity (o'+z') has a value sufficient to provide the uncapped resin with a number average molecular weight of 500 g/mol to <7,000 g/mol;

wherein the weight ratio of the uncapped resin (B2) to the capped resin (B1) is greater than 0.51 to 58.82;

wherein (A) the polydiorganosiloxane component and (B) the polyorganosilicate resin component are present in amounts to provide a weight ratio of the polyorganosilicate resin component (B) to the polydiorganosiloxane component (A) of 1.2:1 to less than 1.62:1;

(C) a polyorganohydrogensiloxane of unit formula (C-I):

(C-I)

where each $R^M$ is independently selected from the group consisting of a monovalent hydrocarbon group of 1 to 30 carbon atoms that is free of aliphatic unsaturation and a monovalent halogenated hydrocarbon group free of aliphatic unsaturation; and subscripts p, q, r, s, t, and u have values such that p≥0, q≥0, r≥0, s≥0, t≥0, u≥0, (t+u)≥2, and a quantity (p+q+r+s+t+u) is sufficient to provide the polyorganohydrogensiloxane with a degree of polymerization of 5 to 100; that is present in an amount to provide a molar ratio of silicon bonded hydrogen atoms to alkenyl groups for the curable composition of 5 to 50;

(D) a hydrosilylation reaction catalyst in an amount sufficient to provide 1 to 1000 ppm of platinum group metal; and (E) a condensation reaction catalyst;

wherein the content of alkenyl groups in the curable composition is in a range of 0.017 weight-percent to 0.089 weight-percent;

where weight-percentages are relative to combined weights of components (A), (B), (C), (D) and (E).

2. The curable composition of claim 1, further comprising (F) 0.001 weight-percent to 5 weight-percent of a hydrosilylation reaction inhibitor and (G) 0.01 weight-percent to 5 weight-percent of an anchorage additive, or mixtures thereof, where weight-percentages are based on combined weights of components (A), (B), (C), (D) and (E).

3. The curable composition of claim 1, where, in formula (A-I), each $R^M$ is independently selected from an alkyl group of 1 to 6 carbon atoms; each $R^U$ is independently selected from the group consisting of vinyl, allyl, and hexenyl; and a quantity (a+b) has a value sufficient to impart a viscosity of 300 milliPascal*seconds to 100,000 milliPascal*seconds to the aliphatically unsaturated polydiorganosiloxane polymer.

4. The curable composition of claim 1, where, in unit formula (A-III), each $R^M$ is independently an alkyl group of 1 to 6 carbon atoms; each $R^U$ is independently selected from the group consisting of vinyl, allyl, and hexenyl; and subscript e is sufficient to provide the hydroxyl-terminated polydiorganosiloxane gum with a plasticity of 30 mil (0.76 mm) to 70 mil (1.78 mm).

5. The curable composition of claim 1, where, in unit formula (B-II), each $R^M$ is independently an alkyl group of 1 to 6 carbon atoms, each Z is OH, and the quantity (z+o) has a value sufficient to provide the uncapped resin (B2) with a number average molecular weight of 2,900 g/mol to 5,000 g/mol.

6. The curable composition of claim 1, wherein the hydroxyl-terminated polydiorganosiloxane gum (A3) is present at a concentration of 17.67 weight-percent to 36.2 weight-percent, based on combined weights of components (A), (B), (C), (D) and (E).

7. The curable composition of claim 1, wherein the polydiorganosiloxane component (A) comprises 5 weight-percent to 16 weight-percent of the aliphatically unsaturated polydiorganosiloxane polymer (A1) and 20 weight-percent to 30 weight-percent of the hydroxyl-terminated polydiorganosiloxane gum (A3), with weight-percentages relative to combined weights of components (A), (B), (C), (D) and (E); the content of vinyl groups in the curable composition is 0.03 weight-percent to 0.08 weight-percent; the weight ratio of the uncapped resin (B2) to the capped resin (B1) is 0.55 to 5; and the molar ratio of silicon bonded hydrogen atoms to vinyl groups is 10 to 30.

8. A process for preparing the curable composition of claim 1, comprising:

i) mixing the hydroxyl-terminated polydiorganosiloxane gum (A3), the uncapped resin (B2), and the condensation reaction catalyst (E); and ii) further mixing the resulting mixture obtained from step i) with the aliphatically unsaturated polydiorganosiloxane polymer (A1), the capped resin (B1), the polyorganohydrogensiloxane (C), and the hydrosilylation reaction catalyst (D); thereby forming the curable composition.

9. An adhesive article comprising a substrate and a silicone pressure sensitive adhesive on at least one surface of the substrate, wherein the silicone pressure sensitive adhesive is a cured product of the curable composition of claim 1.

10. A method of making an adhesive article, comprising:
optionally (1) treating a surface of a substrate,
(2) coating the curable composition of claim 1 on at least one surface of the substrate, and
(3) curing the curable composition.

* * * * *